(12) United States Patent
Lauder et al.

(10) Patent No.: US 11,473,479 B2
(45) Date of Patent: Oct. 18, 2022

(54) SYSTEM AND METHOD FOR FORMING ELONGATED PERFORATIONS IN AN INNER BARREL SECTION OF AN ENGINE

(71) Applicant: THE BOEING COMPANY, Chicago, IL (US)

(72) Inventors: Arnold J. Lauder, Winnipeg (CA); Mark F. Gabriel, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 575 days.

(21) Appl. No.: 16/560,263

(22) Filed: Sep. 4, 2019

(65) Prior Publication Data
US 2020/0165954 A1 May 28, 2020

Related U.S. Application Data

(63) Continuation of application No. 14/716,402, filed on May 19, 2015, now abandoned, which is a
(Continued)

(51) Int. Cl.
*B23B 39/14* (2006.01)
*F02C 7/045* (2006.01)
(Continued)

(52) U.S. Cl.
CPC ............ *F01N 13/007* (2013.01); *B23B 39/14* (2013.01); *B23B 39/20* (2013.01); *B23B 39/24* (2013.01); *B23C 3/00* (2013.01); *B23C 3/02* (2013.01); *B23C 3/28* (2013.01); *B25J 11/005* (2013.01); *B32B 3/12* (2013.01); *B32B 15/04* (2013.01); *B32B 15/20* (2013.01); *B32B 27/06* (2013.01); *B32B 27/20* (2013.01); *F02C 7/045* (2013.01); *G10K 11/172* (2013.01); *B23B 2215/04* (2013.01); *B23B 2226/27* (2013.01); *B23B 2270/20* (2013.01); *B23B 2270/32* (2013.01); *B23C 2215/04* (2013.01); *B23C 2220/24* (2013.01); *B23C 2226/27* (2013.01); *B23C 2270/18* (2013.01); *B32B 2262/0269* (2013.01);
(Continued)

(58) Field of Classification Search
CPC ........... B32B 3/12; B32B 15/20; B32B 27/06; B32B 2262/101; B32B 2307/102; B32B 2605/18; B23B 39/14; F02C 7/045; F02C 7/24; G10K 11/172
See application file for complete search history.

(56) References Cited

U.S. PATENT DOCUMENTS

2010/0126798 A1* 5/2010 Lalane ..................... F02C 7/24
264/156
2010/0126971 A1* 5/2010 Calder ................. B23K 15/085
219/121.18
(Continued)

*Primary Examiner* — Jeremy A Luks
(74) *Attorney, Agent, or Firm* — The Small Patent Law Group, LL; Joseph M. Butscher

(57) ABSTRACT

Certain embodiments of the present disclosure provide an acoustic inlet barrel of an engine. The acoustic inlet barrel may include an inner barrel configured to provide a boundary for directing airflow through the engine. The inner barrel may include an inner face sheet separated from an outer face sheet by an acoustic core. The inner barrel may include a plurality of elongated, non-circular perforations formed through the inner face sheet.

22 Claims, 15 Drawing Sheets

Related U.S. Application Data continuation-in-part of application No. 14/012,243, filed on Aug. 28, 2013, now Pat. No. 9,370,827.

(51) Int. Cl.

| | |
|---|---|
| *B32B 3/12* | (2006.01) |
| *G10K 11/172* | (2006.01) |
| *B32B 27/06* | (2006.01) |
| *B32B 15/20* | (2006.01) |
| *F01N 13/00* | (2010.01) |
| *B23B 39/24* | (2006.01) |
| *B23B 39/20* | (2006.01) |
| *B23C 3/02* | (2006.01) |
| *B25J 11/00* | (2006.01) |
| *B23C 3/00* | (2006.01) |
| *B32B 15/04* | (2006.01) |
| *B23C 3/28* | (2006.01) |
| *B32B 27/20* | (2006.01) |

(52) U.S. Cl.
CPC ... *B32B 2262/101* (2013.01); *B32B 2262/103* (2013.01); *B32B 2307/102* (2013.01); *B32B 2605/18* (2013.01); *Y02T 50/60* (2013.01); *Y10T 29/49398* (2015.01); *Y10T 408/6764* (2015.01); *Y10T 409/304424* (2015.01)

(56) References Cited

U.S. PATENT DOCUMENTS

| | | | |
|---|---|---|---|
| 2010/0206664 A1* | 8/2010 | Bagnall | G10K 11/172 181/214 |
| 2013/0075193 A1* | 3/2013 | Vavalle | B29C 70/443 156/253 |
| 2013/0087408 A1* | 4/2013 | Mader | B32B 27/08 219/121.72 |

* cited by examiner

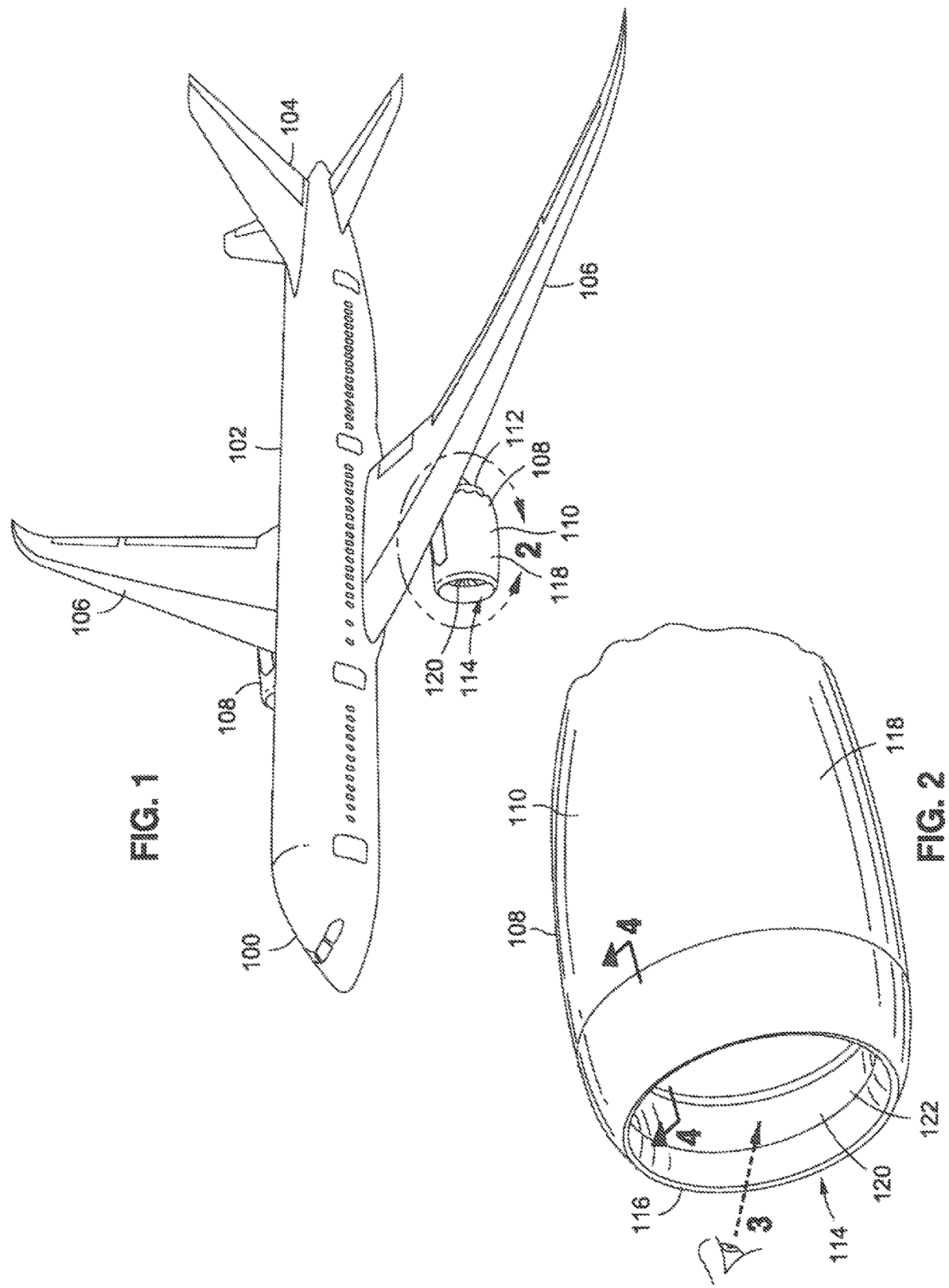

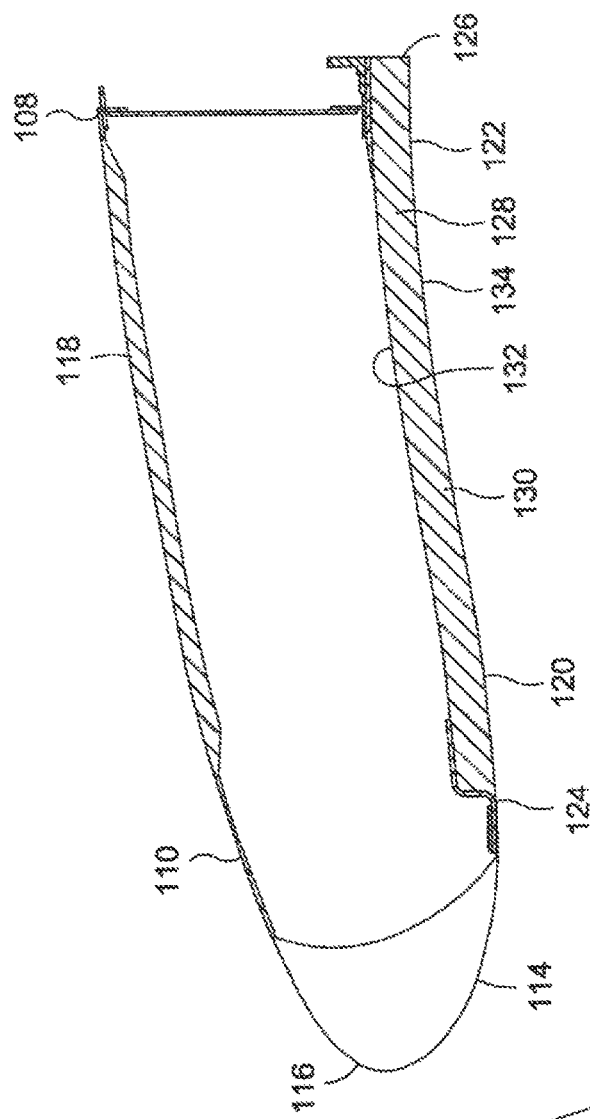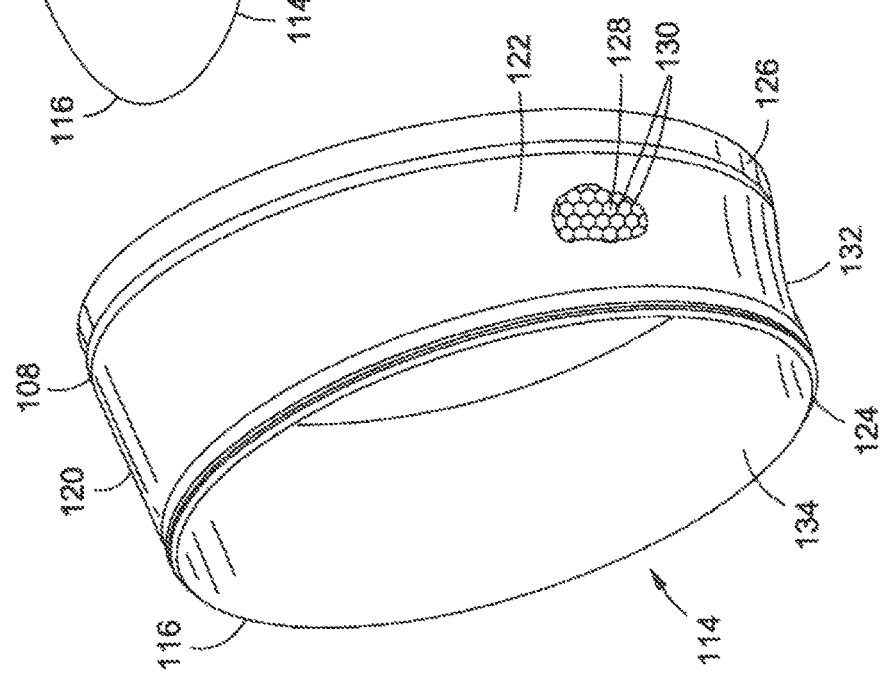

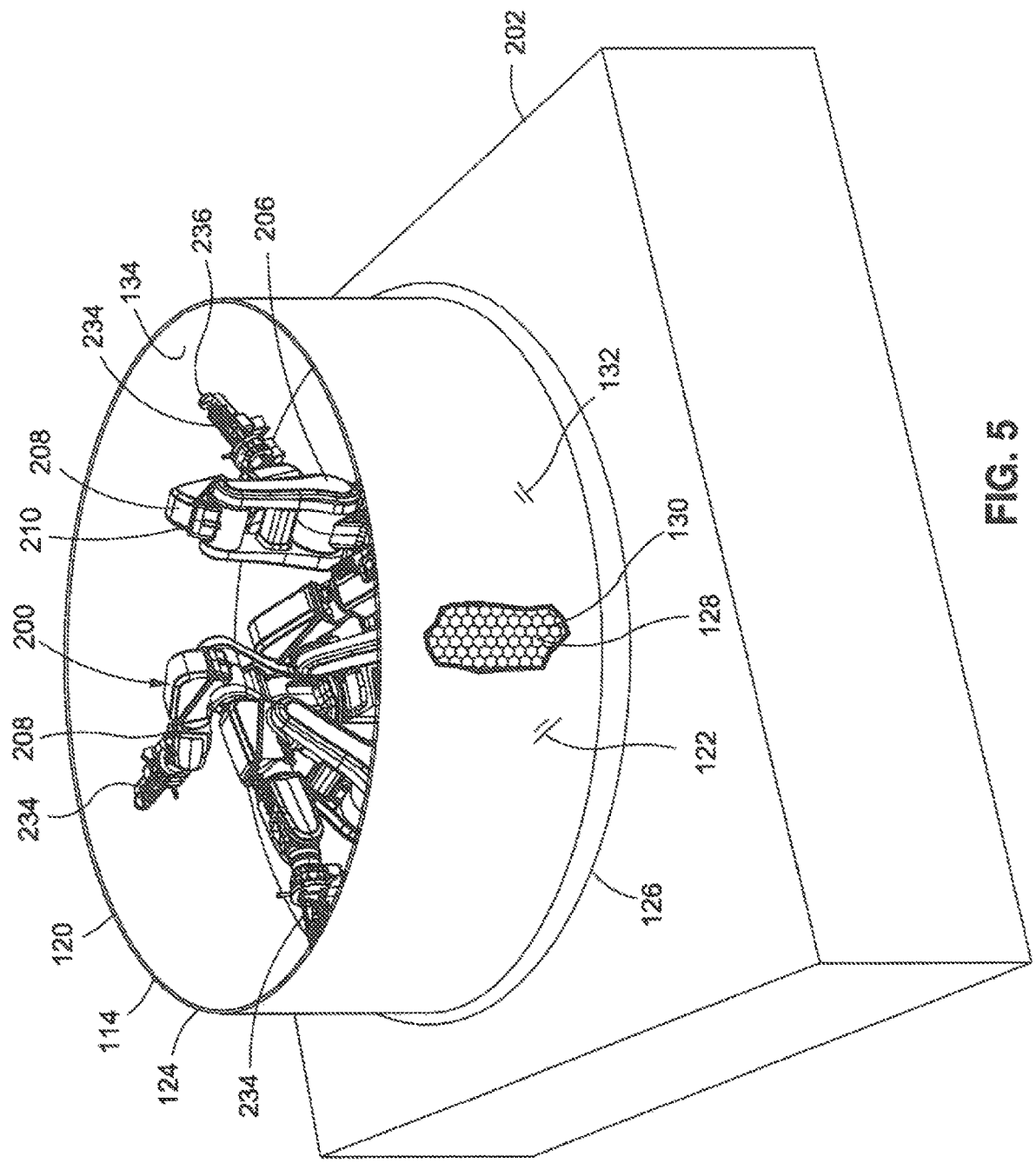

SYSTEM AND METHOD FOR FORMING ELONGATED PERFORATIONS IN AN INNER BARREL SECTION OF AN ENGINE

RELATED APPLICATIONS

This application is a continuation of U.S. patent application Ser. No. 14/716,402, entitled "System and Method for Forming Elongated Perforations in an Inner Barrel Section of an Engine," filed May 19, 2015, which, in turn, is a continuation-in-part of U.S. patent application Ser. No. 14/012,243, entitled "System and Method for Forming Perforations in a Barrel Section," filed Aug. 28, 2013, now U.S. Pat. No. 9,370,827, each of which is hereby incorporated by reference in its entirety.

FIELD OF THE DISCLOSURE

Embodiments of the present disclosure generally relate to production of acoustic treatment of structures and, more particularly, to the forming of acoustic perforations in an engine inlet barrel section.

BACKGROUND

Commercial airliners are required to meet certain noise standards such as during takeoff and landing. A large portion of the noise produced by a commercial airliner during takeoff and landing is generated by gas turbine engines commonly used on airliners. Known methods for reducing the noise level of a gas turbine engine include acoustically treating the engine inlet of the engine nacelle. In this regard, the inner barrel section of a gas turbine engine inlet may be provided with a plurality of relatively small perforations formed in the walls of the inner barrel section. The perforations absorb some of the noise that is generated by fan blades rotating at high speed at the engine inlet, and thereby reduce the overall noise output of the gas turbine engine.

Conventional methods for forming perforations in acoustic structures such as the barrel section include forming the inner wall of the barrel section as a separate component, followed by forming the perforations in the inner wall. The inner wall may then be assembled with other components that make up the barrel section, which is then assembled with the nacelle of the gas turbine engine. Unfortunately, such conventional methods for forming acoustic structures include operations that may result in the blockage of some of the perforations after the perforations have been formed.

Conventional methods for forming acoustic structures may also result in missing perforations. Such blocked perforations or missing perforations may reduce the percent-open-area (POA) of the inner wall (e.g., the total area of the perforations as a percentage of the surface area of the inner wall) which is a characteristic of acoustic structures for measuring their overall effectiveness in absorbing or attenuating noise. Furthermore, conventional methods of forming perforations in acoustic structures are time-consuming processes that add to the production schedule and cost.

Additionally, known systems and methods for forming acoustic structures include forming numerous round holes within an inner barrel. In general, the formation of round holes is simple and effective. However, round holes within an inner barrel may not exhibit acoustic properties that are sufficient to efficiently reduce sound within a structure, device, or component. For example, a pattern of circular holes within the inlet barrel typically depends on a size and nature of the components within an acoustic inlet barrel. For each different acoustic inlet barrel, a unique pattern of circular holes is first determined and then formed. As such, a formed acoustic inlet barrel is typically designed for a particular structure and may not be substituted for another structure having different properties.

A need exists for a system and method for forming perforations in an acoustic structure that minimizes, eliminates, or otherwise reduces the occurrence of blocked or missing perforations, and which may be performed in a timely and cost-effective manner. Further, a need exists for a system and method for efficiently forming perforations within an acoustic structure. Moreover, a need exists for a system and method of manufacturing a complex geometric pattern of perforations on an acoustic inlet barrel of an aircraft engine, or other such structure.

SUMMARY OF THE DISCLOSURE

The above-noted needs associated with forming perforations in an acoustic structure such as an engine inlet are specifically addressed and alleviated by the present disclosure which provides a forming system that may include a plurality of robotic drilling units. Each one of the robotic drilling units may include a drill end effector positioned inside a barrel section of an engine inlet. The barrel section may be configured as a composite sandwich structure having an inner face sheet. The robotic drilling units may be operable in synchronized movement with one another to drill a plurality of perforations into the inner face sheet using the drill end effectors in a manner providing a predetermined percent-open-area of the inner face sheet.

Also disclosed is a method of fabricating an engine inlet. The method may include providing an engine inlet inner barrel section configured as a composite sandwich structure having an inner face sheet, a core, and an outer face sheet. The method may further include robotically drilling a plurality of perforations in the inner face sheet after final cure of the composite sandwich structure. The method may additionally include forming the plurality of perforations in a quantity providing a predetermined percent-open-area of the inner face sheet.

In a further embodiment, disclosed is a method of fabricating an engine inlet including the step of providing an engine inlet inner barrel section configured as a one-piece composite sandwich structure having an inner face sheet, an outer face sheet, and a honeycomb core. The composite sandwich structure may be formed in a single stage cure wherein the inner face sheet, the core, and the outer face sheet may be co-cured and/or co-bonded in a single operation. The method may include drilling, using a plurality of robotic drilling units, a plurality of perforations in the inner face sheet after final cure of the composite sandwich structure. The method may further include operating the plurality of robotic drilling units in synchronized movement with one another to simultaneously drill the plurality of perforations. The method may also include forming the plurality of perforations in a quantity providing a predetermined percent-open-area of the inner face sheet.

Certain embodiments of the present disclosure provide an engine component, such as an acoustic inlet barrel of an engine. The acoustic inlet barrel may include an inner barrel configured to provide a boundary for directing airflow through the engine. The inner barrel may include an inner face sheet separated from an outer face sheet by an acoustic core. The inner face sheet may include a plurality of elongated, non-circular perforations. Optionally, embodiments of the present disclosure may be used with various other components of an engine, such as a translating sleeve, inner walls, and the like.

Each of the perforations may be elongated with respect to a longitudinal axis. The longitudinal axis may align with a flow contour line of the airflow through the engine.

At least one of the perforations may be shaped as an elongated slot. In at least one other embodiment, one or more of the perforations may be shaped as a teardrop, ellipse, dogbone, or the like.

Certain embodiments of the present disclosure provide a method of forming an acoustic inlet barrel of an engine. The method may include sandwiching an acoustic core between an inner barrel and an outer barrel, and forming a plurality of elongated, non-circular perforations in at least a portion of the inner barrel. The forming operation may include using at least one robotic forming unit to elongate each of the perforations with respect to a longitudinal axis.

Certain embodiments of the present disclosure provide a method of forming a component of an engine, such as an acoustic inlet barrel of the engine. The method may include sandwiching an acoustic core between an inner section and an outer section of the component, and forming a plurality of elongated, non-circular perforations in at least a portion of the inner section.

Certain embodiments of the present disclosure provide a forming system that may include at least one robotic forming unit including at least one end effector positioned inside a barrel section configured as a composite sandwich structure having an inner face sheet. The robotic forming unit(s) is operable to form a plurality of elongated, non-circular perforations into the inner face sheet using the end effector(s) to provide a predetermined percent-open-area of the inner face sheet. The robotic forming unit(s) may be further configured to index a pattern of perforations to one or more cell walls of a honeycomb core of the composite sandwich structure, form the hole pattern in the inner face sheet such that the perforations are located at a spaced distance from the cell walls of the honeycomb core, and/or form the perforations such that the percent-open-area in one section of the inner face sheet is different than the percent-open-area in another section of the inner face sheet.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective illustration of an aircraft.

FIG. 2 is a perspective illustration of a nacelle of a gas turbine engine of the aircraft of FIG. 1.

FIG. 3 is a perspective illustration of an inner barrel section of an engine inlet of the gas turbine engine of FIG. 2.

FIG. 4 is a cross-sectional illustration of a leading edge of the engine inlet of the gas turbine engine of FIG. 2.

FIG. 5 is a perspective illustration of an embodiment of a forming system for forming perforations in a barrel section.

DETAILED DESCRIPTION OF THE DISCLOSURE

Figure 6:
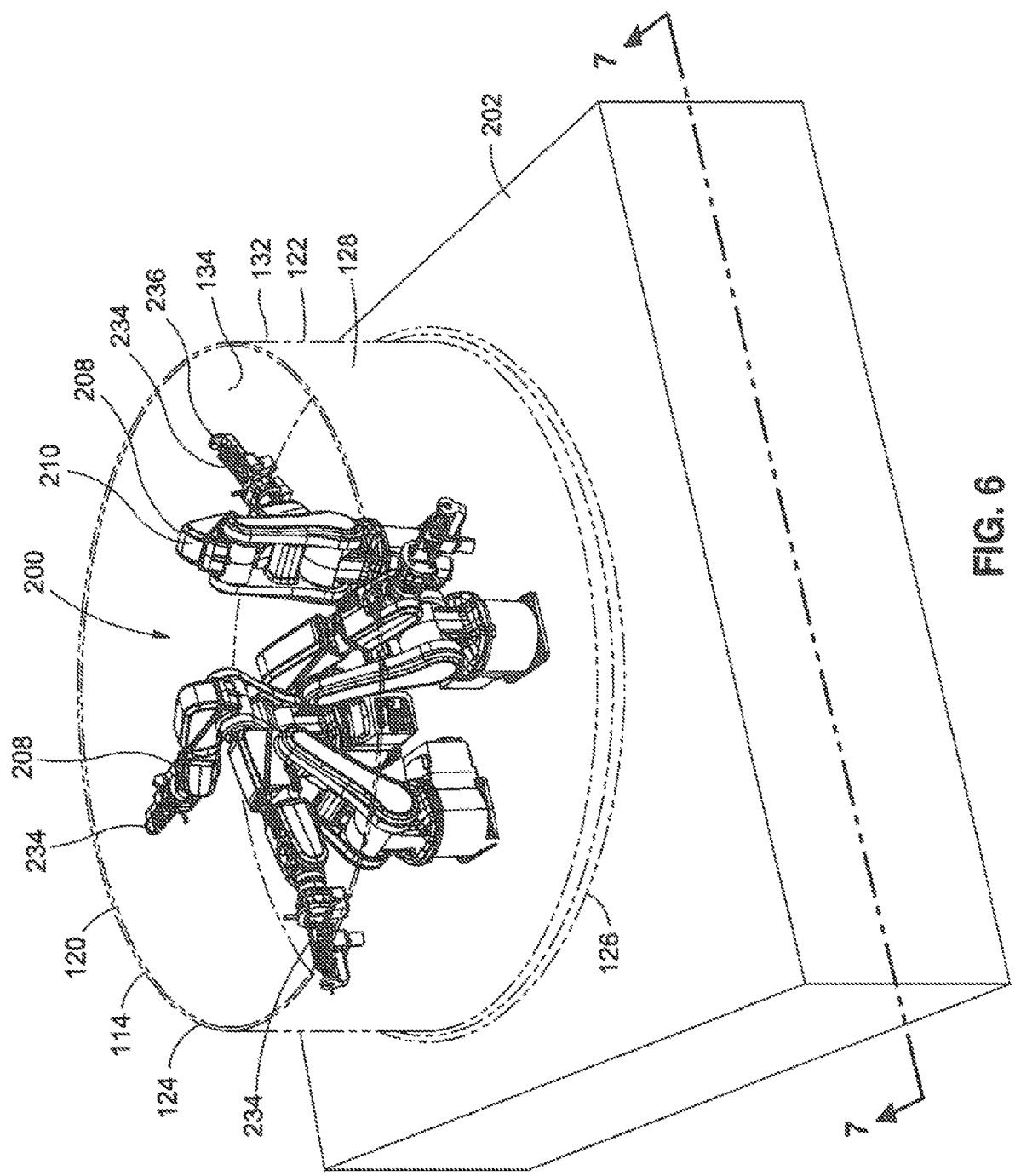
FIG. 6 is a perspective illustration of the forming system with the barrel section shown in phantom lines to illustrate a plurality of robotic drilling units of the forming system.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide systems and methods for forming noise abatement structures having non-circular perforations, such as slots, for example. The non-circular perforations may be formed through use of a plurality of robots and/or drill or mill end effectors. In at least one embodiment, the non-circular perforations may be formed into an inner face sheet of an acoustically treated structure, such as an acoustic inlet barrel of an aircraft engine. Certain embodiments of the present disclosure provide systems and methods for creating a plurality of non-circular perforations on a structure having a complex curvature, such as an acoustically-treated inner barrel of an acoustic inlet barrel of an aircraft engine.

A face sheet may include a single ply of material, or multiple plies of material. For example, the face sheet may include multiple sheets or plies of material that are laminated together.

Certain embodiments of the present disclosure provide an acoustic engine inlet inner barrel that may include an inner portion having a plurality of perforations. Each of the perforations may be elongated along an axis. Each perforation may be formed as a slot, tear drop, ellipse, diamond, or various other elongated shapes. The axis may be substantially parallel to a flow contour line, which may be uniform or non-uniform. The inner barrel may be integrally formed as a single piece.

Certain embodiments of the present disclosure provide a method of creating perforations on an interior of a curved structure that may include loading a program into one or more robots to carve non-circular perforations. Each of the non-circular perforations may be elongated in a first direction. The direction may be parallel to flow contours along a surface of the curved structure.

Embodiments of the present disclosure provide structures having improved acoustic performance and aerodynamics (for example, the non-circular holes may be aligned with airflow that may not be perfectly straight). Further, embodiments of the present disclosure provide efficient manufacturing systems and methods of forming perforations in composite material. Further, embodiments of the present disclosure provide systems and methods of forming non-rectilinear patters of perforations in engine inlet barrels.

Referring now to the drawings wherein the showings are for purposes of illustrating various embodiments of the present disclosure, shown in FIG. 1 is a perspective illustration of an aircraft 100. The aircraft 100 may include a fuselage 102 extending from a nose to an empennage 104. The empennage 104 may include one or more tail surfaces for directional control of the aircraft 100. The aircraft 100 may include a pair of wings 106 extending outwardly from the fuselage 102.

In FIG. 1, the aircraft 100 may include one or more propulsion units which, in an embodiment, may be supported by the wings 106. Each one of the propulsion units may be configured as a gas turbine engine 108 having a core engine (not shown) surrounded by a nacelle 110. The nacelle 110 may include an engine inlet 114 and a fan cowl 118 surrounding one or more fans (not shown) mounted on a forward end (not shown) of the core engine. The nacelle 110 may have an exhaust nozzle 112 (e.g., a primary exhaust nozzle and a fan nozzle) at an aft end (not shown) of the gas turbine engine 108.

FIG. 2 illustrates an embodiment of a gas turbine engine 108 having an engine inlet 114. The engine inlet 114 may include a leading edge 116 and an inner barrel section 120 located aft of the leading edge 116 of the engine inlet 114. The inner barrel section 120 may provide a boundary surface or wall for directing airflow (not shown) entering the engine inlet 114 and passing through the gas turbine engine 108. The inner barrel section 120 may be located in relatively close proximity to one or more fans (not shown). In this regard, the inner barrel section 120 may also be configured to serve as an acoustic structure having a plurality of perforations in an inner face sheet of the inner barrel section 120 for absorbing noise generated by the rotating fans and/or noise generated by the airflow entering the engine inlet 114 and passing through the gas turbine engine 108.

As described below, the total area of the perforations in the inner face sheet may be expressed as a percent-open-area which represents the total area of the perforations as a percentage of the surface area of the inner face sheet. The percent-open-area may be a characteristic for measuring the overall effectiveness or acoustic-attenuating capability of the inner barrel section 120. During the design and/or development of the aircraft 100, a predetermined percent-open-area may be selected for the inner barrel section 120 to meet acoustic performance requirements of the engine inlet 114.

FIG. 3 is a perspective illustration of an embodiment of an inner barrel section 120 of an engine inlet 114. In the embodiment shown, the barrel section 120 may have a diameter (not shown) of up to 5-8 feet or larger, and a length (not shown) extending from an aft edge 126 to a forward edge 124 of up to 2-3 feet or longer. However, the barrel section 120 may be provided in any size, shape, and configuration, without limitation. The inner barrel section 120 may be formed as a composite sandwich structure 122 having an inner face sheet 134 and an outer face sheet 132 separated by a core 128. The inner face sheet 134 and/or the outer face sheet 132 may be formed of composite material including fiber-reinforced polymeric matrix material such as graphite-epoxy, fiberglass-epoxy, or other composite material. Alternatively, the inner face sheet 134 and/or the outer face sheet 132 may be formed of metallic material such as titanium, steel, or other metallic materials or combinations of materials. The core 128 may include a honeycomb core having a plurality of cells 130 oriented generally transverse to the inner face sheet 134 and outer face sheet 132. The core 128 may be formed of metallic material and/or non-metallic material and may include aluminum, titanium, aramid, fiberglass, or other core materials.

In an embodiment, the engine inlet 114 may include a one-piece inner barrel section 120. The inner barrel section 120 may be fabricated from raw materials (not shown) and assembled and cured in one or more stages. For example, the inner face sheet 134 and the outer face sheet 132 may be separately formed by laying up dry fiber fabric (not shown) or resin-impregnated ply material (for example, pre-preg) on separate layup mandrels (not shown) and separately cured, followed by bonding the inner face sheet 134 and the outer face sheet 132 to the core 128. Alternatively, the inner barrel section 120 may be fabricated in a single-stage cure process in which the inner face sheet 134 may be laid up on a layup mandrel (not shown), after which the core 128 may be laid up over the inner face sheet 134, followed by laying up the outer face sheet 132 over the core 128. The layup assembly (not shown) may be cured in a single stage, after which a forming system disclosed herein may be implemented for forming perforations in the inner face sheet 134.

In at least one embodiment, the forming system may be implemented for forming a plurality of perforations in the inner face sheet 134 of the assembled barrel section 120. The perforations may be non-circular. For example, the perforations may be formed as elongated structures, such as slots, elliptical openings, diamond-shaped openings, dogbone-shaped openings, and/or the like. In at least one embodiment, the forming system may include a plurality of robotic drilling units positioned inside the barrel section 120 for robotically drilling a plurality of the perforations in the inner face sheet 134 after final cure of the composite sandwich structure 122. The perforations may be formed in a size and quantity to provide a predetermined percent-open-area for the inner barrel section 120 to allow the inner barrel section 120 to meet acoustic performance requirements of the engine inlet 114.

In FIG. 3, the inner barrel section 120 may include a unitary structure having a closed shape with a generally cylindrical configuration. However, in at least one other embodiment, the inner barrel section 120 may be formed as multiple segments (not shown) assembled together to form a closed shape. The inner barrel section 120 may be provided in a contoured cross-sectional shape (not shown) to promote airflow through the gas turbine engine 108. In this regard, when viewed along a circumferential direction, the inner barrel section 120 may have a cross section that may be complexly curved and may be formed complementary to the shape of the engine inlet 114 leading edge 116 at a forward edge 124 of the inner barrel section 120, and complementary to the shape of the interior nacelle surfaces (not shown) aft of the inner barrel section 120. However, the inner barrel section 120 may be provided in any shape including a simple cylindrical shape and/or a conical shape.

FIG. 4 is a cross-sectional illustration of the leading edge 116 of the engine inlet 114 showing the composite sandwich construction including the circumferential inner face sheet 134, the circumferential outer face sheet 132, and the core 128 separating the inner face sheet 134 and outer face sheet 132 of the barrel section 120. The forward edge 124 of the inner barrel section 120 may be coupled to or may interface with the engine inlet 114 leading edge 116. The aft edge 126 of the inner barrel section 120 may be coupled to or may interface with the nacelle interior (not shown). In the embodiment shown, the inner face sheet 134, the core 128, and the outer face sheet 132 may have a complexly-curved cross sectional shape to promote efficient airflow through the nacelle 110.

FIG. 5 is an illustration of an embodiment of a forming system 200 as may be implemented for forming perforations in a barrel section, such as the inner barrel section 120 of the engine inlet 114 of the gas turbine engine 108 (shown in FIG. 3). However, the forming system 200 may be implemented for forming perforations in any type of barrel structure for any application, without limitation. For example, the forming system 200 may be implemented for forming perforations in a barrel section of any one of a variety of different types of commercial, civilian, and military aircraft. Furthermore, the forming system 200 may be implemented for forming perforations in the barrel section of a gas turbine engine of rotorcraft, hovercraft, or in any other vehicular or non-vehicular application in which a predetermined quantity of acoustic perforations are desired for acoustic attenuating purposes.

In FIG. 5, the forming system 200 is shown mounted within an interior of the barrel section 120. The forming system 200 may include robotic forming units 208 that are configured to form perforations in a barrel section 120 according to embodiments of the present disclosure. For example, the robotic forming units 208 may be configured to provide a predetermined percent-open-area of the inner face sheet 134 of the barrel section 120. As indicated above, the predetermined percent-open-area 144 may be determined during the design and/or development of the aircraft 100 (shown in FIG. 1) to meet acoustic performance requirements of the engine inlet 114. The forming system 200 is configured to consistently form perforations in the inner face sheet 134 of the composite sandwich structure 122 barrel sections 120 to provide a predetermined percent-open-area in the inner face sheet 134. In this regard, the forming system 200 advantageously overcomes the drawbacks associated with conventional methods for forming perforations in conventional inner barrel sections such as the above-mentioned drawbacks associated with blocked perforations due to subsequent processing of a conventional inner barrel section in a conventional multi-stage forming process, and/or due to missing perforations (not shown) during conventional perforating of the inner skin of a conventional inner barrel section. Such blocked perforations or missing perforations may reduce the predetermined percent-open-area of the inner skin of the conventional inner barrel section which may otherwise reduce the acoustic performance of the engine inlet 114.

In FIG. 5, a plurality of robotic forming units 208 (for example, two robotic forming units 208, three robotic forming units 208, etc.) may be supported on a system base 202. Each one of the robotic forming units 208 may include an end effector 234, such as a drill end effector, a mill end effector, or the like. In at least one embodiment, the system base 202 may include a relatively rigid structure and a tooling fixture, a shop floor, or a table configured to support the plurality of robotic forming units 208. In addition, the system base 202 may be configured to support the barrel section 120. However, the forming system 200 may be provided in another embodiment in which the plurality of robotic forming units 208 are supported by a structure that is located separate from the barrel section 120. For example, the plurality of robotic forming units 208 may be suspended over the inner barrel section 120 such as by an overhead fixture (not shown) in a manner such that the end effectors 234 may be positioned within the interior of the barrel section 120, and/or the plurality of robotic forming units 208 may be mounted inside or outside of the barrel section 120.

Figure 7:
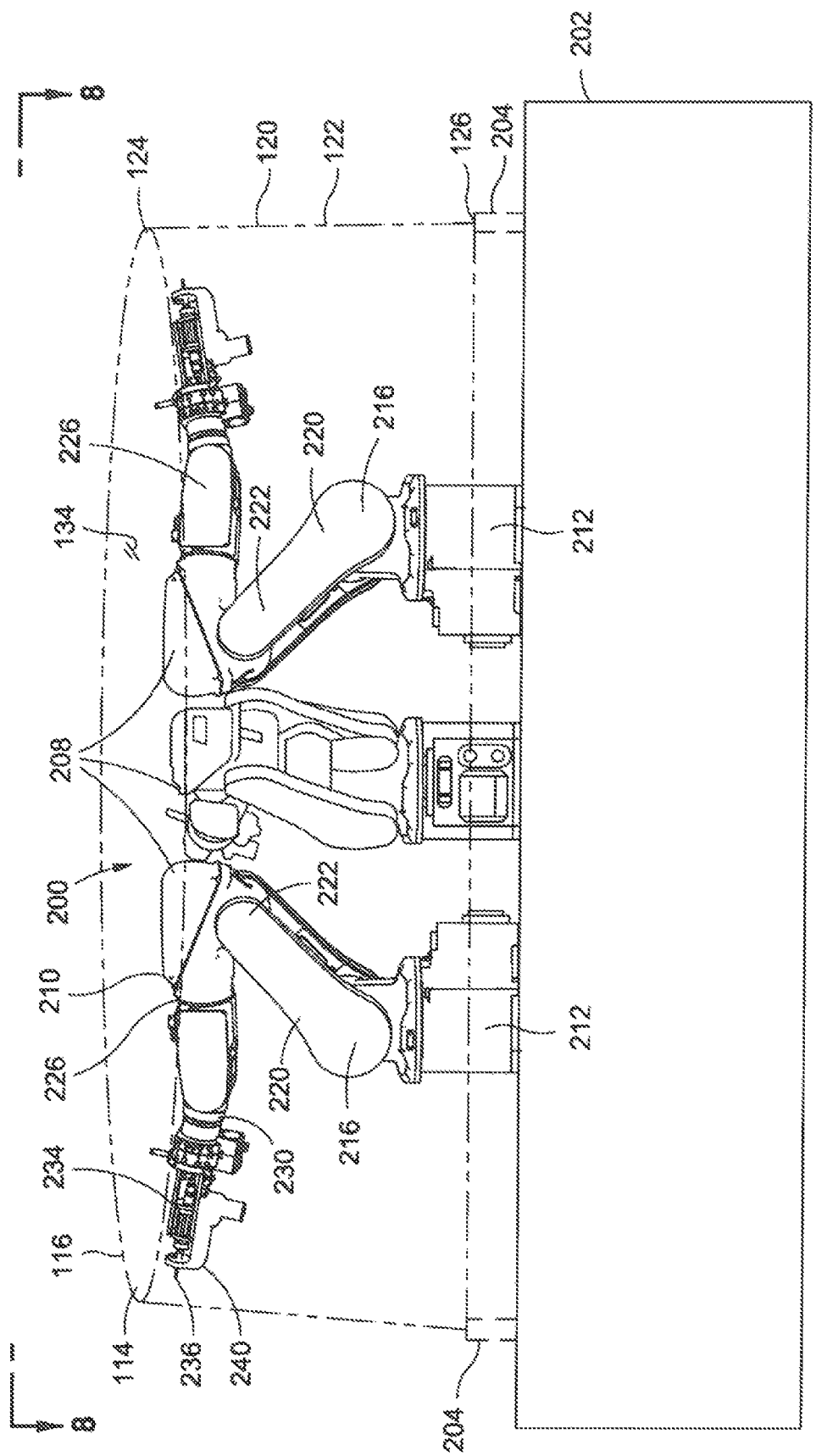
FIG. 7 is a side view of the forming system.

FIG. 6 is a perspective illustration of the plurality of robotic forming units 208 positioned on the system base 202 and mounted within relatively close proximity to one another such that the barrel section 120 circumscribes the plurality of robotic forming units 208 when the barrel section 120 is mounted to the system base 202. Although four (4) robotic forming units 208 are shown, any number may be provided. In an embodiment, the robotic forming units 208 may be mounted in an array. For example, each one of the robotic forming units 208 may include a forming unit base 212 (such as shown in FIG. 7). The forming unit bases 212 may be mounted to the system base 202 in a circular array 206 (as shown in FIG. 8) such that when the barrel section 120 is mounted to the system base 202, each one of the forming unit bases 212 is positioned at substantially the same distance from the inner face sheet 134 of the barrel section 120.

FIG. 7 is a side view of an embodiment of the forming system 200. The barrel section 120, shown in phantom lines, may be supported on one fixture 204 or multiple fixtures 204. The fixtures 204 may include spacers sized and configured to position the barrel section 120 at a vertical location that is complementary to the movement capability of the end effectors 234 of the robotic forming units 208. In this regard, the fixtures 204 may be configured such that the end effectors 234 may form perforations (such elongated, non-circular perforations) in the inner face sheet 134 of the barrel section 120 at any vertical location between the forward edge 124 of the barrel section 120 and the aft edge 126 of the barrel section 120. Each of the fixtures 204 may include a rigid material and may be configured as simple blocks (not shown) formed of metallic or polymeric material and which may be fixedly coupled to the system base 202.

The fixtures 204 may extend vertically along any portion of the height of the barrel section and horizontally along any portion of the circumference of the barrel section 120.

Figure 8:
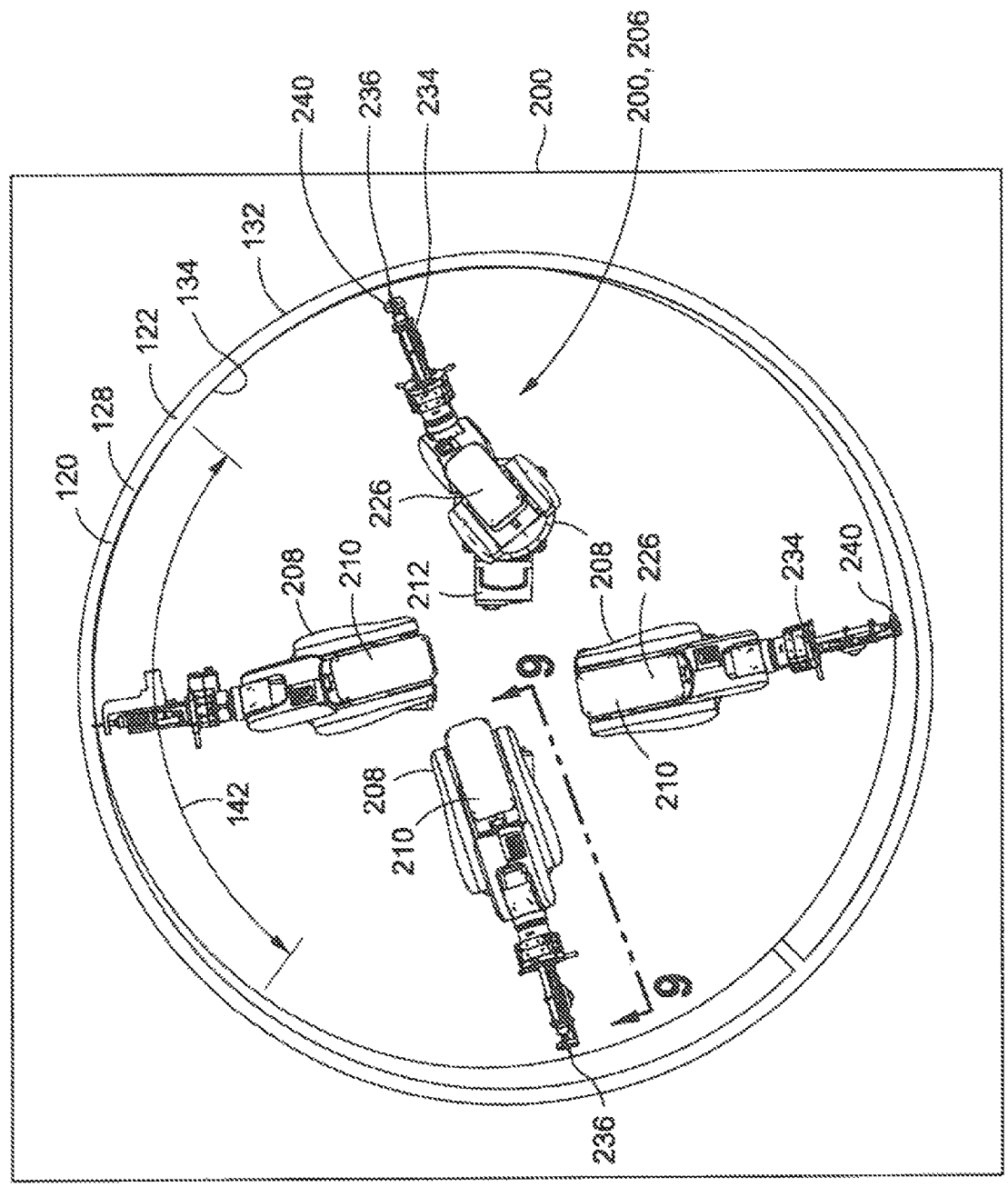
FIG. 8 is the top view of the forming system.

FIG. 8 is a top view of the forming system 200 illustrating an arrangement of the robotic forming units 208. Each one of the robotic forming units 208 may include a robotic arm assembly 210 having an end effector 234 mounted on an end of the robotic arm assembly 210. The robotic forming units 208 may be mounted such that forming unit bases 212 are positioned adjacent to a center of the array of the robotic forming units 208. In at least one embodiment, the forming system 200 may include a single robotic forming unit 208 or a plurality of robotic forming units 208. For example, the forming system 200 may include two (2) or more robotic forming units 208 having forming unit bases 212 which may be arranged at a predetermined spacing relative to one another, such as a substantially equiangular spacing relative to one another.

Referring still to FIG. 8, the plurality of robotic forming units 208 may be configured (for example, programmed) to drill perforations (such as elongated, non-circular perforations) within substantially equivalent arc segments 142 of the barrel section 120. For example, for the embodiment shown, the plurality of robotic forming units 208 may include four (4) robotic forming units 208. The forming unit bases 212 may be arranged such that the forming unit bases 212 are positioned at an angular spacing of approximately ninety degrees relative to one another. In at least one embodiment, each one of the robotic forming units 208 may be configured to form perforations within an approximate ninety-degree arc segment 142 of the barrel section 120. However, the robotic forming units 208 may be positioned at any location relative to one another and may be configured to form perforations at any circumstantial location or any vertical location of the barrel section 120.

In FIG. 8, the end effector 234 of each one of the robotic forming units 208 may be oriented generally radially outwardly away from the forming unit base 212. The forming unit bases 212 may be positioned to provide space for movement of the robotic arm assemblies 210 during operation of the forming system 200. In this regard, the robotic forming units 208 are simultaneously operable in synchronized movement with one another in a manner allowing the end effectors 234 to simultaneously form a plurality of perforations in the barrel section 120. The robotic forming units 208 may be programmed to avoid collisions with one another and with the barrel section 120 during the synchronized movement with one another.

Figure 9:
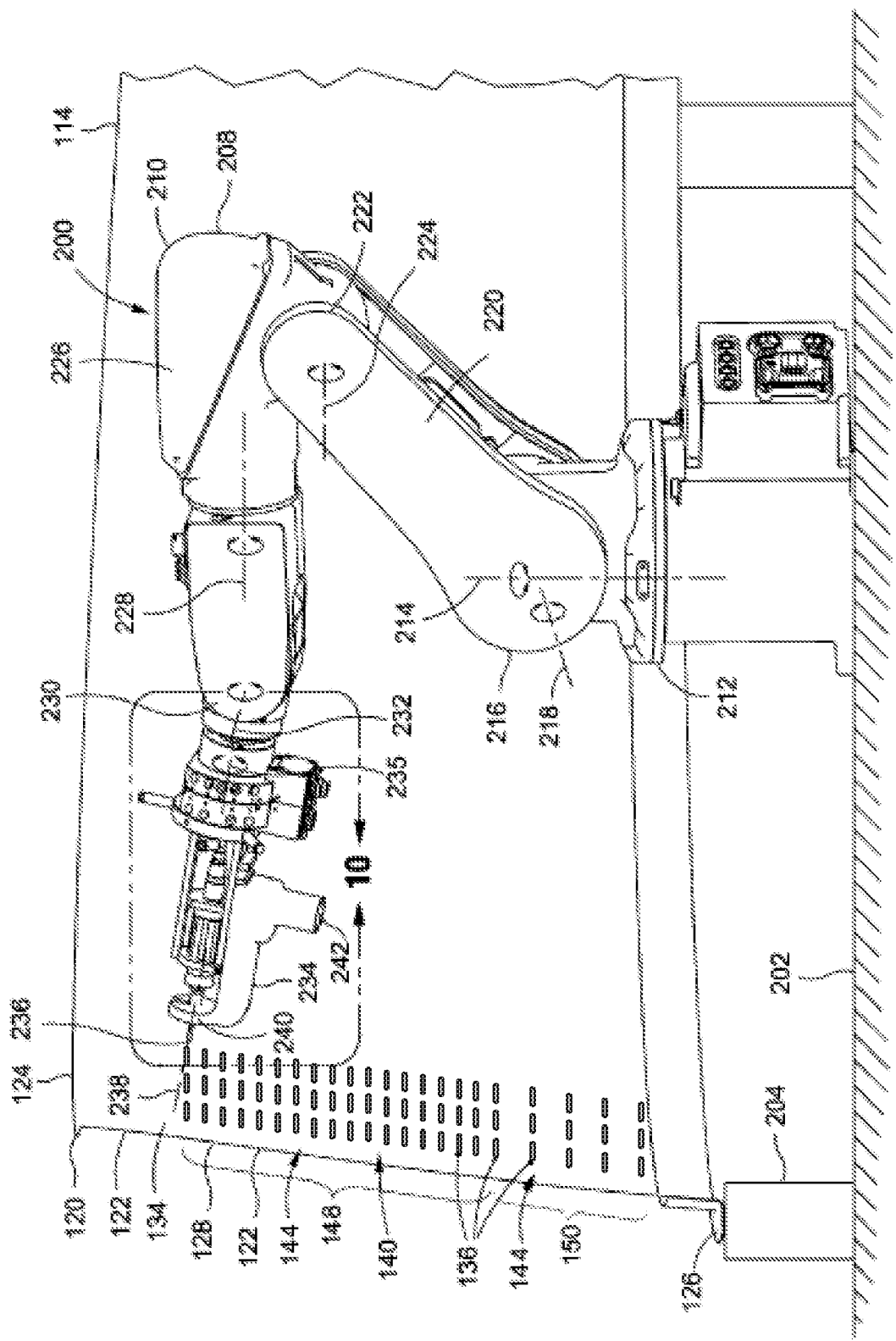
FIG. 9 is a side view of one of the robotic drilling units forming a perforation pattern along an inner face sheet of the inner barrel section.

FIG. 9 is a side view of one of the robotic forming units 208 showing the barrel section 120 supported on fixtures 204 and illustrating a forming bit 236 of one of the end effectors 234 forming perforations 136 in a predetermined perforation pattern 140 along the inner face sheet 134 of the inner barrel section 120. In this regard, in at least one embodiment, each one of the robotic forming units 208 may be indexed to the system base 202. The barrel section 120 may also be indexed to the system base 202 such as with fixtures 204 to provide a means for the end effector 234 to form perforations 136 within a relatively small positional tolerance relative to a circumferential direction (not shown) of the barrel section 120 and relative to an axial direction (not shown) of the barrel section 120. However, the barrel section 120 and the robotic forming units 208 may be indexed relative to one another by other means, and are not necessarily limited to being indexed to the system base 202.

In FIG. 9, the robotic forming units 208 may be operated in a manner to form the perforations 136 in the inner face sheet 134 such that a percent-open-area 144 in one section 148 of the inner face sheet 134 is different than the percent-open-area 144 in another section 150 of the inner face sheet 134. In this regard, the robotic forming units 208 may be programmed to form perforations 136 to provide a greater percent-open-area 144 in a first section 148 of the inner face sheet 134 relative to drilling perforations 136 to provide a lower percent-open-area 144 in a second section 150 of the inner face sheet 134. For example, the second section 150 with a smaller percent-open-area 144 may be located adjacent to a forward edge 124 and/or an aft edge 126 of the barrel section 120, and the first section 148 with a larger percent-open-area 144 may be located in an interior region (not shown) of the inner barrel section 120 between the forward edge 124 and the aft edge 126. However, the robotic forming 208 units may form the perforations 136 such that the percent-open-area 144 in the inner face sheet 134 is different at different circumferential sections (not shown) of the barrel section 120, or the percent-open-area 144 of the inner barrel section 120 may vary in a different manner than the above-noted embodiments.

In FIG. 9, one or more of the robotic forming units 208 may have a six-axis robotic arm assembly 210 which may allow for accurately positioning the end effector 234 at any desired location and orientation along the inner face sheet 134. As the end effector 234 is positioned and oriented at a desired location of a perforation 136, the end effector 234 may be moved axially to drive the forming bit 236 into the inner face sheet 134 to form a perforation 136. After an initial opening is formed, the forming bit 236 may radially shift through a radial arc to form the elongated perforation 136. In this manner, the forming bit 236 may be a drill or milling bit that may be configured to rotate about a central longitudinal axis and radially shift in order to form the elongated perforation 136. In at least one other embodiment, the forming bit 236 may be sized and shaped as a desired shape of an elongated perforation 136 and puncture the inner face sheet 134 to form the elongated perforation 136. Alternatively, the end effector 234 may be positioned at a desired location of a perforation 136 on the inner face sheet 134, and the end effector 234 may axially drive the forming bit 236 along a direction of the forming bit axis 238 to drill the perforation 136 in the inner face sheet 134. In at least one embodiment, the six-axis robotic arm assembly 210 may include a first arm 220 which may be attached to the forming unit base 212 at a shoulder joint 216. The first arm 220 may be attached to a second arm 226 at an elbow joint 222. The second arm 226 may be attached to the end effector 234 at a wrist joint 230.

In FIG. 9, the forming unit base 212 may be configured to rotate about a vertical base axis 214 relative to the system base 202. The first arm 220 may be configured to rotate about a shoulder axis 218 of the shoulder joint 216 coupling the first arm 220 to the forming unit base 212. The second arm 226 may be configured to rotate about an elbow axis 224 of the elbow joint 222 coupling the second arm 226 to the first arm 220. A portion of the second arm 226 may also be configured to swivel about a second arm axis 228 extending along a direction from the elbow joint 222 to the wrist joint 230. The end effector 234 may be configured to rotate about a wrist axis 232 of the wrist joint 230. In addition, the end effector 234 may be configured to rotate about an end effector axis 235 which may be generally parallel to the forming bit axis 238. In an optional embodiment, the end effector 234 may be configured to linearly translate the forming bit 236 along a forming bit axis 238 such as when drilling a portion of perforation 136 in the inner face sheet 134.

In FIG. 9, the robotic arm assembly 210 is shown in a six-axis embodiment. However, the robotic arm assembly 210 may be provided in alternative arrangements. For example, the robotic arm assembly 210 may be provided in a 3-axis embodiment, a 4-axis embodiment, or a 5-axis embodiment. In addition, the robotic arm assembly 210 may be provided in an embodiment having more than six (6) axes. Furthermore, the robotic arm assembly 210 may be configured as a motion control system (not shown), a rigid frame (not shown) having linear axes along which the end effector is movable, or any other type of motion control device for controlling an end effector 234 for forming the perforations 136. In addition, each robotic arm assembly 210 may include more than one end effector 234. Furthermore, each end effector 234 may have more than one forming bit 236 for simultaneously forming perforations 136.

Figure 10:
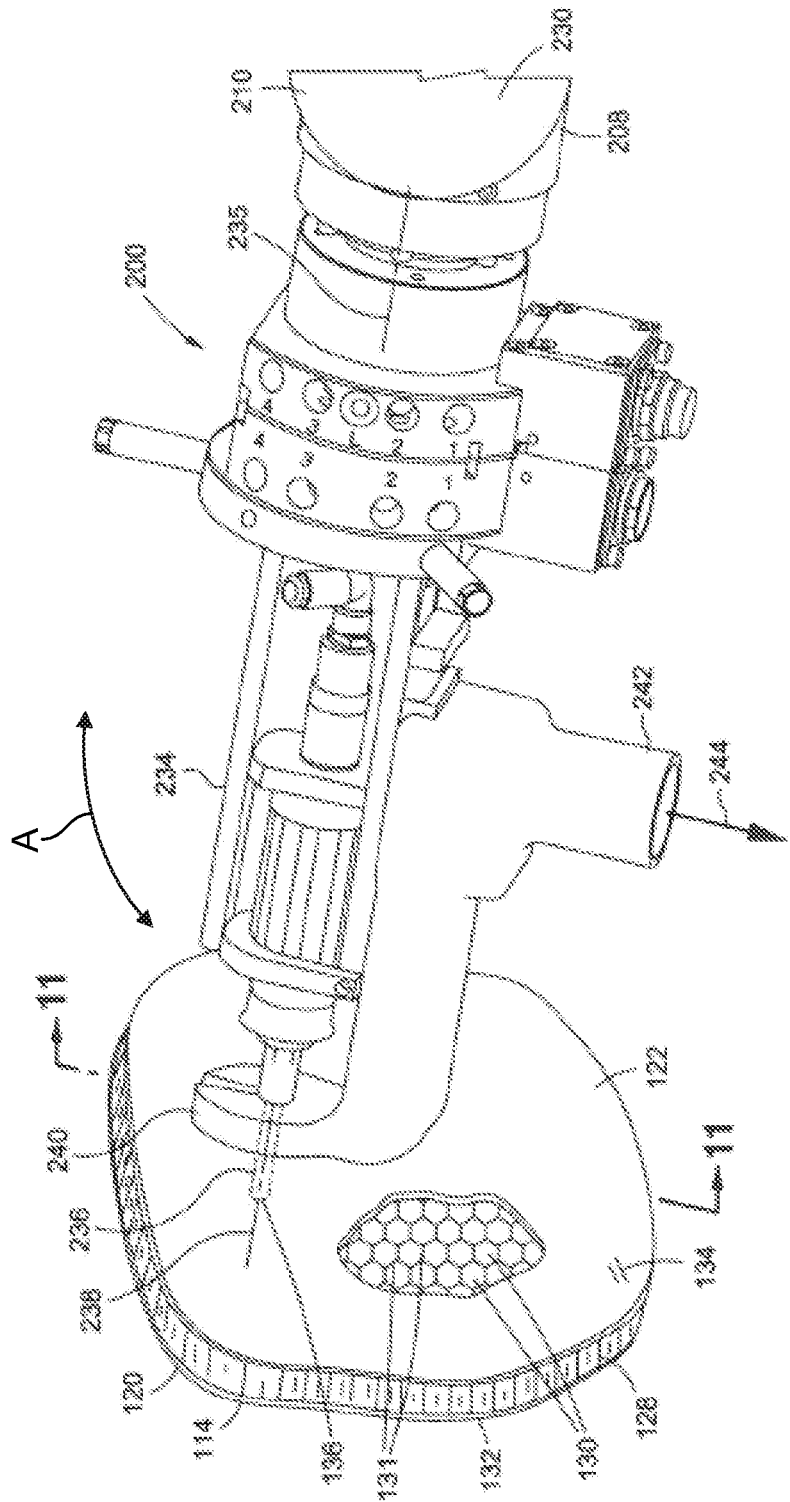
FIG. 10 is a perspective illustration of a drill end effector forming a perforation in an inner face sheet of a composite sandwich structure of the inner barrel section.

FIG. 10 shows an end effector 234 forming a perforation 136 in the inner face sheet 134 of a composite sandwich structure 122 of the inner barrel section 120. Advantageously, the forming system 200 is configured to accurately and rapidly place the end effector 234 for forming perforations 136 in a predetermined perforation pattern, such as the pattern 140 shown in FIG. 9. For example, in at least one embodiment, each one of the end effectors 234 of a robotic forming unit 208 may be configured to form up to three (3) or more perforations 136 per second, per end effector 234. In at least one embodiment, the end effector 234 may be provided with a forming bit 236 configured to form elongated, non-circular acoustic perforations 136 having a length of approximately 0.2 inch, 0.3 inch, 0.4 inch, or 0.5 inch. Optionally, the perforations 136 may be longer or shorter than noted.

As shown, the end effector 234 may initially form a portion of the perforation 136 through a drilling operation. For example, the end effector 234 may be rotated about its central longitudinal axis and urged into the inner face sheet 134. After the initial portion is formed through the drilling operation, the forming system 200 may be rotated in a radial sweeping direction A to elongate the perforation 136 starting from the initial drilled opening to an end point, as determined by the forming program. In at least one other embodiment, the forming system 200 may remain in a fixed position, while the barrel section 120 is rotated about a central axis relative to the forming system 200.

In at least one embodiment, for forming perforations 136 in a composite inner face sheet 134, the end effector 234 may be configured to drive the forming bit 236 at a feed rate of approximately 20-60 inches per minute, and at rotational speeds of between approximately 20,000 to 40,000 rpm, although larger or smaller feed rates and larger or smaller rotational speeds may be selected based on the material being drilled and the composition of the forming bit 236. The forming bit 236 feed rate and the forming bit 236 rotational speed may be controlled to minimize forming bit 236 wear, and such that the perforations 136 may meet tight tolerances for size, shape, and other hole parameters. Significantly, each robotic forming unit 208 may be configured to quickly and accurately form perforation patterns at a relatively small center-to-center positional tolerance (that is, perforation-to-perforation) such as a center-to-center positional tolerance of approximately 0.010 inch or less. However, the center-to-center positional tolerance may be greater than 0.010 inch, such as up to approximately 0.050 inch or greater.

One or more of the end effectors 234 may include a vacuum attachment 240 for removing debris (not shown) such as dust and chips that may be generated as the perforations 136 are formed. The vacuum attachment 240 may have a hollow (not shown) or open portion (not shown) that may be positioned around the forming bit 236 and may be placed adjacent to or in contact with the inner face sheet 134 when the forming bit 236 contacts the inner face sheet 134 and forms a perforation 136. The vacuum attachment 240 may include a vacuum port 242 for connection to a vacuum source (not shown) using a vacuum hose (not shown) for drawing a vacuum 244 on the vacuum attachment 240 for drawing debris (not shown) from the area surrounding the perforation 136.

In at least one embodiment, the forming system 200 may be provided with an automated bit changer (not shown) for changing the forming bits 236 using robotic control. In this manner, worn forming bits 236 may be replaced after forming a predetermined quantity of perforations 136. For example, an automated bit changer (not shown) may replace each forming bit 236 after forming anywhere from approximately 1,000 to 30,000 perforations 136, although the forming bits 236 may be replaced after forming a smaller or larger quantity of perforations 136 than the above-noted range. Depending upon the size (for example, diameter and height) of the inner barrel section 120 and the total quantity of robotic forming units 208 that are used, each end effector 234 may undergo 1 to 20 or more forming bit changes per barrel section 120, for example.

Referring again to FIG. 9, in at least one embodiment, the end effectors 234 may be controlled to form perforations 136 in a perforation pattern 140 of vertical rows along a height of the barrel section 120. In this regard, each end effector 234 may form a vertical row of perforations 136, and the end effector 234 may be rotated about the vertical base axis 214 to allow the end effector 234 to form another vertical row of perforations 136 adjacent to the previously-formed vertical row of perforations 136. The end effectors 234 may also be controlled to form perforations 136 in horizontal rows (not shown), or in any other direction or combination of directions. As indicated above, the robotic arm assemblies 210 may be operated in a synchronized manner such that the end effectors 234 are maintained at a generally equiangular spacing from one another during the simultaneous drilling of perforations 136 in the inner face sheet 134 of the barrel section 120. For example, for a forming system 200 having four (4) robotic forming units 208, the end effectors 234 may be maintained at an angular separation of approximately ninety (90) degrees from each other during the simultaneous forming of perforations 136 in the inner face sheet 134.

Figure 11:
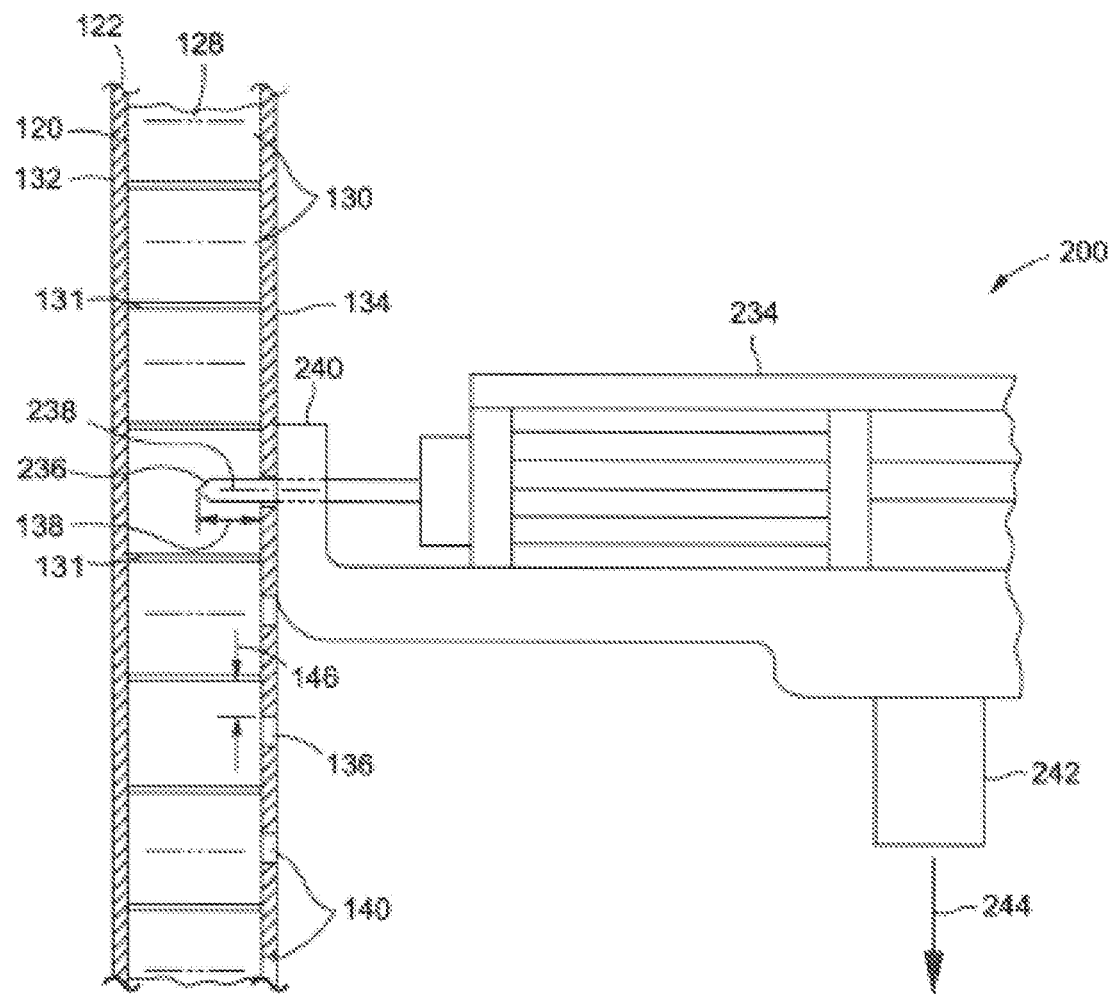
FIG. 11 is a cross sectional illustration taken along line 11 of FIG. 10 and illustrating a drill bit of the drill end effector drilling a perforation in the inner face sheet of the composite sandwich structure.

FIG. 11 is a cross sectional view of a forming bit 236 of the end effector 234 forming a perforation 136 in the inner face sheet 134 of a composite sandwich structure 122. In an embodiment, the end effector 234 may include a forming stop (not shown) to control a depth 138 at which the forming bit 236 extends into the composite sandwich structure 122, and minimize the depth 138 of the forming bit 236 into the core 128 material. Furthermore, a forming stop (not shown) may stabilize the end effector 234 when forming the perforation 136 to prevent lateral movement of the forming bit 236 relative to the perforation 136, and which may advantageously avoid a non-conformance regarding the positional tolerance, arcuate tolerance, or other tolerance parameters of the perforation 136. In at least one embodiment, each end effector 234 may include a non-contact method of gauging the depth 138 at which each perforation 136 is drilled such as by using a laser device (not shown), an ultrasonic device (not shown), and other non-contact device. The depth 138 of forming may also be controlled by a controller (not shown) controlling the end effector 234.

Figure 12:
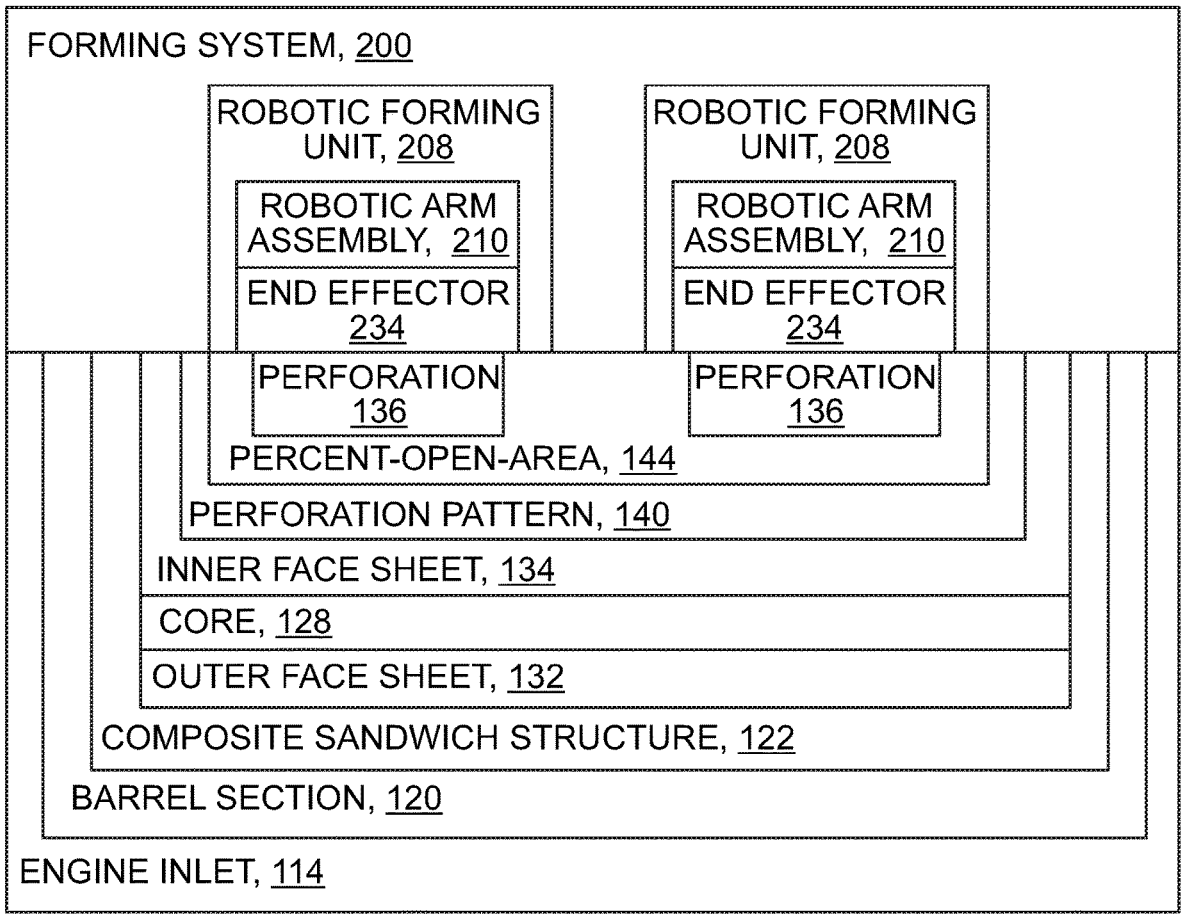
FIG. 12 is a block diagram of an embodiment of the forming system.

FIG. 12 is a block diagram of an embodiment of a forming system 200. The forming system 200 may include a plurality of robotic forming units 208. Each one of the robotic forming units 208 may include a robotic arm assembly 210 as described above. An end effector 234 may be coupled to the end of each one of the robotic arm assemblies 210 of each robotic forming unit 208. The robotic forming units 208 may be simultaneously operable in synchronized movement with one another such that the end effectors 234 may simultaneously form a plurality of perforations 136 in the barrel section 120.

In FIG. 12, the barrel section 120 may include an inner barrel section 120 of an engine inlet 114 such as that of a gas turbine engine 108 (shown in FIG. 3), as indicated above. In at least one embodiment, the barrel section 120 may be formed as a composite sandwich structure 122. The composite sandwich structure 122 may have an outer face sheet 132, a core 128, and an inner face sheet 134 which may be assembled or bonded together to form a one-piece engine inlet inner barrel section 120. The forming system 200 may rapidly and accurately form a plurality of perforations 136 in a predetermined perforation pattern of perforations 136 (FIG. 9) in the inner face sheet 134 to provide a predetermined percent-open-area 144 for the inner barrel section 120 to meet acoustic performance requirements.

Figure 13:
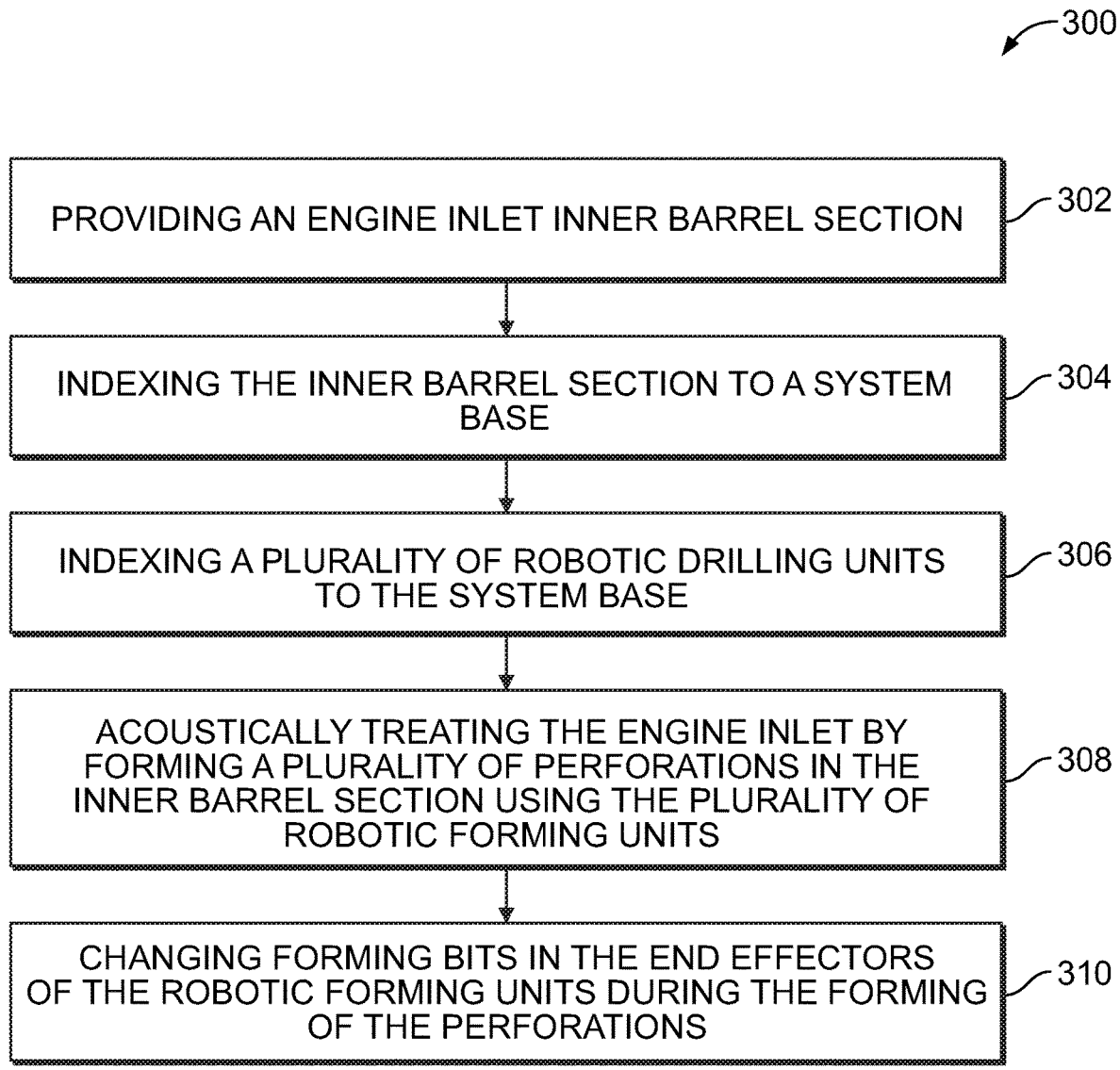
FIG. 13 is an illustration of a flow chart including one or more operations that may be implemented in a method of fabricating an engine inlet.

FIG. 13 is an illustration of a flow chart including one or more operations that may be included in a method 300 of fabricating an engine inlet 114 (FIG. 3). Step 302 of the method may include providing a barrel section 120 (FIG. 3) such as an inner barrel section 120 (FIG. 3) of an engine inlet 114 (FIG. 3). As indicated above, the inner barrel section 120 (FIG. 3) may be provided as a one-piece composite sandwich structure 122 (FIG. 3). In such a composite sandwich structure 122 (FIG. 3), the inner face sheet 134 (FIG. 3) may be formed of composite material and the outer face sheet 132 (FIG. 3) may be formed of composite material (for example, fiber-reinforced polymeric matrix material). However, the inner face sheet 134 (FIG. 3) and/or the outer face sheet 132 (FIG. 3) may be formed of metallic material, or a combination of metallic material and non-metallic material.

As indicated above, the core 128 (FIG. 3) may include honeycomb core formed of metallic material and/or non-metallic material and may include aluminum, titanium, aramid, fiberglass, or other core materials. The engine inlet 114 (FIG. 3) inner barrel section 120 (FIG. 3) may be fabricated as a one-piece composite sandwich structure 122 (FIG. 3) formed in a single-stage cure. As described above, the barrel section 120 (FIG. 3) may be provided in a single-stage cure wherein the inner face sheet 134 (FIG. 3), the core 128 (FIG. 3), and the outer face sheet 132 (FIG. 3) may be laid up on a layup mandrel, after which heat and/or pressure may be applied to the layup (not shown) for a predetermined time for curing in a single stage.

Step 304 of the method 300 of FIG. 13 may include mounting and indexing the inner barrel section 120 (FIG. 7) to a system base 202 (FIG. 7). In this regard, the inner barrel section 120 (FIG. 7) may be supported on a plurality of fixtures 204 (FIG. 7) which may be mounted to the system base 202 (FIG. 7). The fixtures 204 (FIG. 7) may fixedly position the inner barrel section 120 (FIG. 7) on the system base 202 (FIG. 7) which may comprise a table (not shown), an assembly (not shown), or other relatively rigid structure configured to support the inner barrel section 120 (FIG. 7) and prevent movement thereof during the drilling of the perforations 136 (FIG. 9) in the inner barrel section 120 (FIG. 7).

As indicated above, the fixtures 204 may be positioned at spaced intervals around a perimeter (not shown) of the inner barrel section 120 such as along the aft edge 126 (FIG. 9) or forward edge 124 (FIG. 9) of the inner barrel section 120. The fixtures 204 may include mechanical indexing features (not shown) to index the inner barrel section 120 to the fixtures 204. A laser system (not shown) may be implemented to aid in positioning the inner barrel section 120 relative to the fixtures 204. The inner barrel section 120 may be mechanically coupled to the fixtures 204 to rigidly clamp the inner barrel section 120 in position.

Step 306 of the method 300 of FIG. 13 may include indexing the plurality of robotic forming units to the system base 202 (FIG. 7) as shown in FIG. 7. In at least one embodiment, each one of the plurality of robotic forming units 208 (FIG. 7) may have a forming unit base 212 (FIG. 7) that may be directly mounted to the system base 202 and indexed to the system base 202 and/or to the fixtures 204 (FIG. 7) supporting the inner barrel section 120 (FIG. 7). For example, the forming unit bases 212 of the robotic forming units 208 may be mounted to the system base 202 and may be located inside the inner barrel section 120 as shown in FIG. 7. Alternatively, the forming unit bases 212 may be located outside of the inner barrel section 120 and the end effectors 234 (FIG. 7) of the robotic arm assemblies 210 (FIG. 7) may extend inside the inner barrel section 120 to form the perforations 136 (FIG. 9). In a further embodiment, the robotic forming units 208 may be supported by a structure (not shown) that is located separate from the system base 202 and separate from the barrel section 120. For example, the forming unit bases 212 of the robotic forming units 208 may be mounted to an overhead fixture (not shown) that may be indexed to the system base 202 and/or to the fixtures 204 supporting the inner barrel section 120. The end effectors 234 may extend inside the barrel section 120 to drill the perforations 136.

Step 308 of the method 300 of FIG. 13 may include acoustically treating the engine inlet 114 (FIG. 9) by robotically forming a plurality of perforations 136 (FIG. 9) into the inner face sheet 134 (FIG. 9) of the composite sandwich structure 122 (FIG. 9) engine inlet 114 inner barrel section 120 (FIG. 9) such as after final cure of the composite sandwich structure 122. For example, the method 300 may include robotically forming the plurality of perforations 136 in the inner barrel section 120 using a plurality of the robotic forming units 208 (FIG. 9). The method 300 may include simultaneously forming the plurality of perforations 136 in the inner face sheet 134 using the end effectors 234 (FIG. 9) to provide a predetermined percent-open-area 144 of the inner face sheet 134. In an embodiment, each one of the robotic forming units 208 may include a robotic arm assembly 210 (FIG. 9) configured as a three-axis, four-axis, five-axis, or six-axis arm assembly respectively having three axes, four axe, five axes, and six axes. The robotic arm assemblies 210 may be programmed to move the end effectors 234 in a synchronized manner relative to one another to form the perforations 136 at a relatively rapid rate. For example, each one of the end effectors 234 may be configured to form 2-3 or more perforations 136 per second.

The method 300 (FIG. 13) may include forming the perforations 136 (FIG. 9) in a predetermined perforation pattern 140 (FIG. 9) in the engine inlet 114 (FIG. 9) inner barrel section 120 (FIG. 9) which may have a honeycomb core 128 (FIG. 11). The robotic forming units 208 (FIG. 9)

may be configured to control the end effectors 234 (FIG. 9) to form the perforations 136 normal (for example, perpendicular) to the inner face sheet 134 (FIG. 10). In addition, the robotic forming units 208 may be configured to form the perforations 136 at a spaced distance to the cell walls 131 (FIG. 11) of the honeycomb core 128. In this regard, the robotic forming units 208 may be configured to form one or more perforations 136 in each of the cells 130 at a distance from the cell walls 131 to avoid puncturing the cell walls 131. The robotic forming units 208 may form the perforations 136 in a perforation pattern 140 that may be configured complementary to the geometry and size of the cells 130 of honeycomb core 128. For example, the perforation pattern 140 (FIG. 9) may be such that one perforation 136 (FIG. 11) is formed into each cell 130 (FIG. 11) such as at an approximate center (not shown) of each cell 130. However, the perforation pattern 140 may be such that two or more perforations 136 may be formed into each cell 130 of the honeycomb core 128 (FIG. 11).

The robotic forming units 208 (FIG. 9) may be configured to index or position the perforation pattern 140 (FIG. 9) relative to the cell 130 (FIG. 11) centers (not shown) or relative to the cell walls 131 (FIG. 11) of a honeycomb core 128. For example, for a honeycomb core 128 having a generally uniform arrangement of cells 130 of equal size and shape, the robotic forming units 208 may be configured to establish a location of one of the cell walls 131 in order to index a perforation pattern 140 relative to the locations of the cell 130 of the honeycomb core 128. After establishing the location of one or more cell walls 131, the robotic forming units 208 may be configured to form the perforation pattern 140 of perforations 136 in the inner face sheet 134 of the honeycomb core 128 such that each perforation 136 is formed at a predetermined location in each cell 130 such as at a center (not shown) of each cell 130, or at a predetermined location or spaced distance 146 relative to the cell walls 131 of each cell 130. The perforation pattern 140 may also be such that multiple perforations 136 may be formed into each cell 130 and may be located at predetermined distances or spaced distances 146 from the cell walls 131 of each cell 130.

Advantageously, the robotic forming units 208 (FIG. 9) may be configured to form perforations 136 (FIG. 9) within a relatively high positional tolerance (e.g., 0.010 inch on centers) in the hole-to-hole spacing. In addition, as indicated above, each one of the end effectors 234 (FIG. 10) may include a vacuum attachment 240 (FIG. 10) configured to be positioned adjacent to or against the inner face sheet 134 during the forming of the perforations 136. The vacuum attachment 240 may include a vacuum port 242 (FIG. 11) that may be coupled to a vacuum source (not shown) via a vacuum hose (not shown) to provide a vacuum 244 (FIG. 10) for suctioning dust, chips, and other debris away from a location where a perforation 136 is being drilled.

Step 310 of the method 300 of FIG. 13 may include periodically changing the forming bits 236 (FIG. 10) of the end effectors 234 (FIG. 10) during the process of forming perforations 136 (FIG. 10) in the inner barrel section 120 (FIG. 10). In an embodiment, the method may include robotically changing the forming bits 236 using an automated bit changer (not shown). Forming bits 236 may be replaced after forming a predetermined quantity of perforations 136. For example, each forming bit 236 may be replaced after forming several thousand or more perforations 136. The frequency at which the forming bits 236 may be replaced may be affected by the thickness of the inner face sheet 134 (FIG. 11), the material composition of the inner face sheet 134, a rotational speed of the forming bit 236, the feed rate of the forming bit 236, the material composition of the forming bit 236, and other factors. In at least one embodiment, the method may include detecting when a forming bit 236 is becoming dull, at which point the method may include replacing the dull forming bit 236 with a new or sharpened forming bit.

Advantageously, the forming system 200 (FIG. 12) and method disclosed herein provides for operating a plurality of robotic forming units 208 (FIG. 12) in a synchronized manner to accurately and rapidly form perforations 136 (FIG. 12) in the inner face sheet 134 (FIG. 12) of an inner barrel section 120 (FIG. 12) with a high degree of repeatability. In addition, the forming system 200 provides a means for forming perforations 136 with a significant reduction in defects and rework commonly associated with conventional methods. In this regard, the forming system 200 and method disclosed herein may avoid the above-mentioned defects of missing perforations (not shown) and/or blocked perforations (not shown) during subsequent processing in a multi-stage barrel section fabrication process (not shown), and the associated reduction in percent-open-area 144 (FIG. 9) in the inner face sheet 134 of the inner barrel section 120.

As indicated above, the percent-open-area 144 (FIG. 9) of the inner face sheet 134 is the total area of the perforations 136 (FIG. 9) as a percentage of the surface area (not shown) of the inner face sheet 134 (FIG. 9) and is a characteristic for measuring the overall effectiveness or acoustic-attenuating capability of the inner barrel section 120 (FIG. 9). In FIG. 9, the robotic forming units 208 (FIG. 9) may be operated in a manner to form perforations 136 to provide a percent-open-area 144 (FIG. 9) in one section 148 (FIG. 9) of the inner face sheet 134 that is different than the percent-open-area 144 in another section 150 (FIG. 9) of the face sheet 134. For example, in FIG. 9, a first section 148 of perforations 136 formed in the inner face sheet 134 may have a larger percent-open-area 144 relative to a second section 150 of perforations 136 which may be located adjacent to a forward edge 124 and/or an aft edge 126 of the barrel section 120. However, as indicated above, differing sections (not shown) of percent-open-area 144 may be arranged in any manner along the inner face sheet 134 of the inner barrel section 120 (FIG. 9), and are not limited to the arrangement shown in FIG. 9 or described above.

Figure 14:
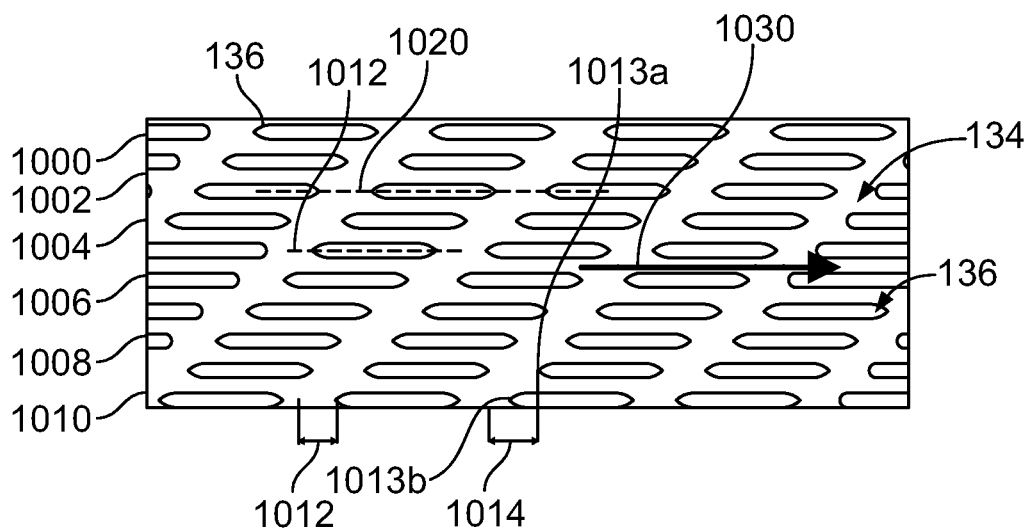
FIG. 14 illustrates an interior face view of an inner face sheet having a plurality of elongated perforations, according to an embodiment of the present disclosure.

FIG. 14 illustrates an interior face view of the inner face sheet 134 having a plurality of elongated perforations 136, according to an embodiment of the present disclosure. The inner face sheet 134 may be formed of a cured composite material. Alternatively, the face sheet 134 may be formed of a metallic structure. Each perforation 136 may be formed as a non-circular opening formed through the face sheet 134. For example, the perforations 136 may be formed as elongated slots. In at least one embodiment, the slots 136 may be approximately 0.1 inch long. In at least one another embodiment, the slots 136 may be approximately 0.7 inch long. It is to be understood, however, that the slots may be greater or lesser than 0.1 inch long or greater or lesser than 0.7 inch long.

The percent-open-area of the face sheet 134 (that is, the area of the face sheet 134 that is occupied by the perforations 136) may be approximately 30%. Alternatively, the percent-open-area of the face sheet 134 may be greater or lesser than 30%. For example, in at least one embodiment, the percent-open-area may be 15%. In at least one other embodiment, the percent-open-area may be 50%. The percent-open-area may be determined by the size, shape, weight, and other properties of the acoustic inlet barrel. For example, if the acoustic core of the acoustic inlet barrel has relatively large, thick honeycomb cells, the percent-open-area may be increased beyond 30%, as the larger, thicker honeycomb cells may more efficiently absorb sound energy. Conversely, if the acoustic core of the acoustic inlet barrel has smaller cells, the percent-open-area may be less than 30%.

Overall, the use of elongated perforations 136 allows for simpler, easier, and more efficient manufacturing processes. For example, if it is determined that additional percent-open-area is desired, the elongated perforations 136 may be elongated to a greater length. In contrast, if circular openings were used, an entire hole pattern may need to be determined and recalculated, and an initial face sheet having an undesired hole pattern may need to be discarded.

As shown, rows 1000, 1002, 1004, 1006, 1008, and 1010 of elongated perforations 136 may be offset with respect to one another. For example, perforations 136 in the row 1000 may not be radially aligned (or vertically aligned, as shown in FIG. 14) with the perforations 136 in the row 1002. For example, a leading edge 1013a of a perforation 136 in the row 1008 may be axially offset with respect to a rear of a leading edge 1013b of a perforation 136 in the row 1010. Further, a spacing 1012 between adjacent perforations 136 in a row may be configured to provide a desired percent-open-area.

Each of the perforations 136 may be the same size and shape. Alternatively, certain perforations 136 may be sized and shaped differently than other perforations 136.

As shown, each perforation 136 may be elongated along or otherwise with respect to a longitudinal axis 1020, which may generally bisect each perforation into lateral halves. The longitudinal axis 1020 may be substantially parallel to a flow contour line 1030, which may be uniform or non-uniform. The flow contour line 1030 represents a direction of airflow through an acoustic inlet barrel, for example.

Figure 15:
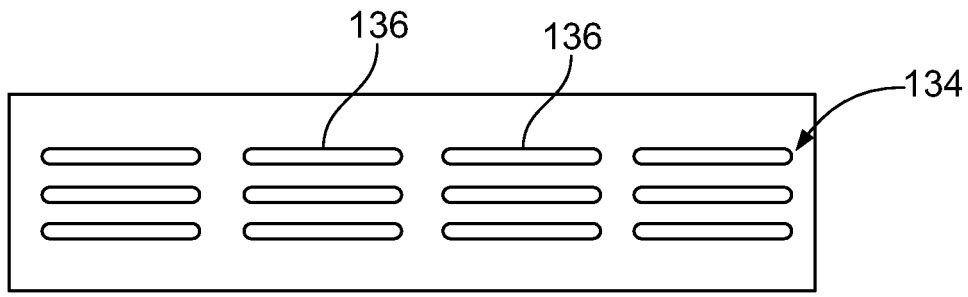
FIG. 15 illustrates an interior face view of an inner face sheet having a plurality of elongated perforations, according to an embodiment of the present disclosure.

FIG. 15 illustrates an interior face view of the inner face sheet 134 having a plurality of elongated perforations 136, according to an embodiment of the present disclosure. The inner face sheet 134 shown in FIG. 15 is similar to the inner face sheet 134 shown in FIG. 14, except that the perforations 136 with adjacent rows may be radially aligned with one another.

Figure 16:
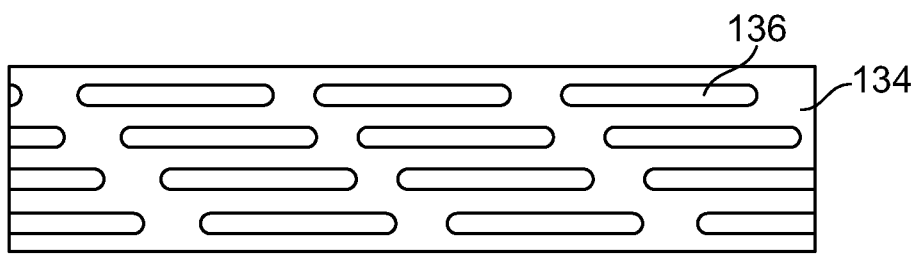
FIG. 16 illustrates an interior face view of an inner face sheet having a plurality of elongated perforations, according to an embodiment of the present disclosure.

FIG. 16 illustrates an interior face view of the inner face sheet 134 having a plurality of elongated perforations 136, according to an embodiment of the present disclosure. The inner face sheet 134 shown in FIG. 15 is similar to the inner face sheet 134 shown in FIG. 14, except that the perforations 136 in adjacent rows may be offset in an opposite direction.

Referring to FIGS. 14-16, the elongated, non-circular perforations 136 may form various other patterns than shown. The perforation pattern 136 may be any pattern desired. In at least one embodiment, each row of perforations may include the same number of perforations 136. In at least one other embodiment, the number of perforations 136 in at least one row may differ than the number of perforations 136 in other rows.

Figure 17:
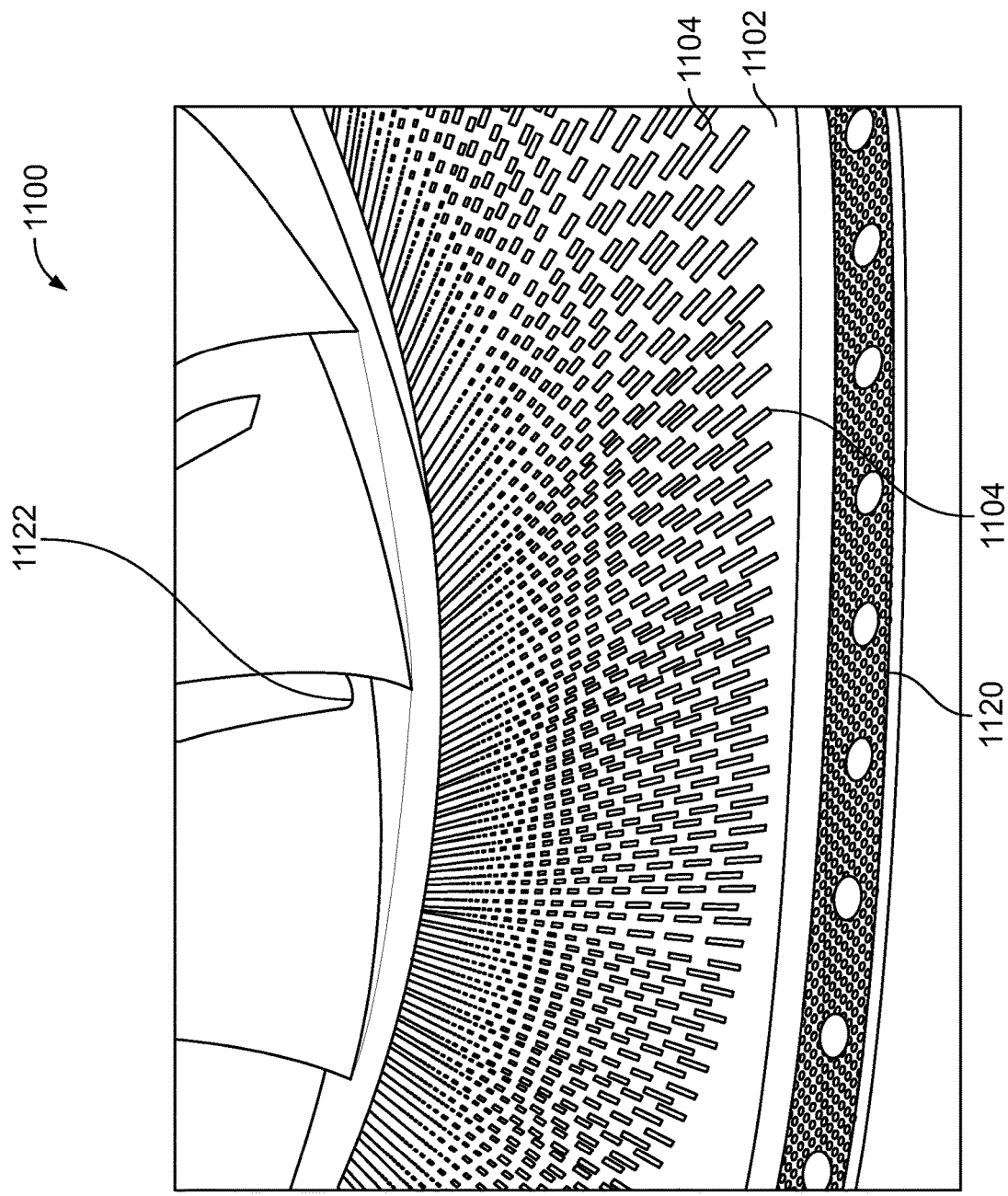
FIG. 17 illustrates a perspective interior view of an acoustic inlet barrel, according to an embodiment of the present disclosure.

FIG. 17 illustrates a perspective interior view of an acoustic inlet barrel 1100, according to an embodiment of the present disclosure. The acoustic inlet barrel 1100 includes an inner face sheet 1102 having a plurality of elongated perforations 1104. The perforations 136 may be parallel to or otherwise aligned with a flow contour of airflow that flows from the front 1120 of the acoustic inlet barrel 1100 to a rear 1122 of the acoustic inlet barrel 1100.

Figure 18:
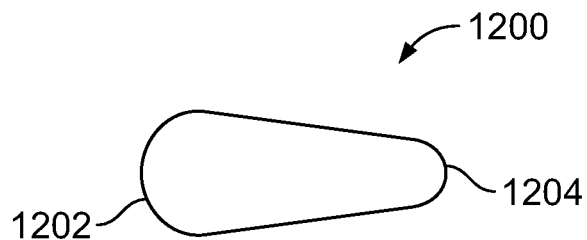
FIG. 18 illustrates an interior face view of a perforation formed in an inner face sheet, according to an embodiment of the present disclosure.

FIG. 18 illustrates an interior face view of a perforation 1200 formed in an inner face sheet, according to an embodiment of the present disclosure. The perforation 1200 includes an expanded front end 1202 connected to a reduced rear end 1204. The perforation 1200 may form a teardrop shape.

Figure 19:
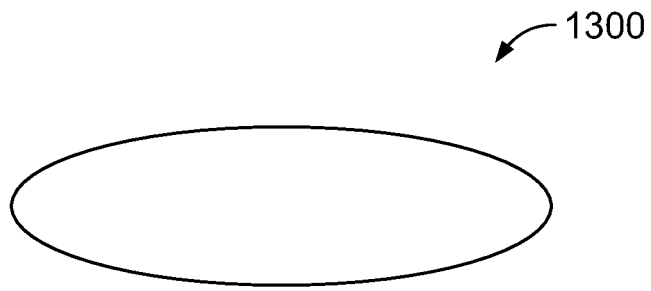
FIG. 19 illustrates an interior face view of a perforation formed in an inner face sheet, according to an embodiment of the present disclosure.

FIG. 19 illustrates an interior face view of a perforation 1300 formed in an inner face sheet, according to an embodiment of the present disclosure. The perforation 1300 form a teardrop shape.

Figure 20:
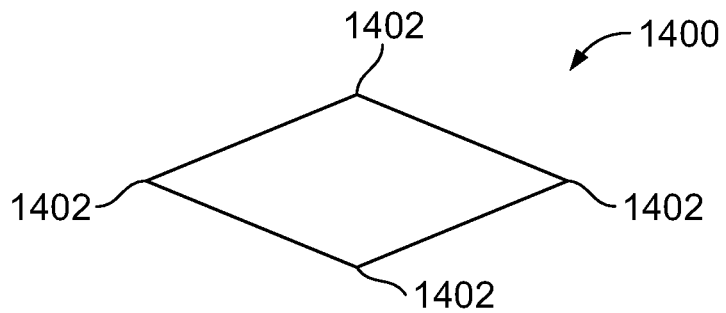
FIG. 20 illustrates an interior face view of a perforation formed in an inner face sheet, according to an embodiment of the present disclosure.

FIG. 20 illustrates an interior face view of a perforation 1400 formed in an inner face sheet, according to an embodiment of the present disclosure. The perforation 1400 may form a diamond shape. The perforation 1400 may have angled corners 1402. The corners 1402 may have distinct edges, or may be blunted, rounded, or curved.

Figure 21:
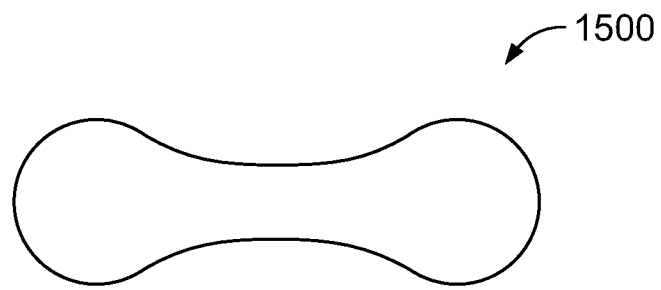
FIG. 21 illustrates an interior face view of a perforation formed in an inner face sheet, according to an embodiment of the present disclosure.

FIG. 21 illustrates an interior face view of a perforation 1500 formed in an inner face sheet, according to an embodiment of the present disclosure. The perforation 1500 may have a dogbone or barbell shape.

Figure 22:
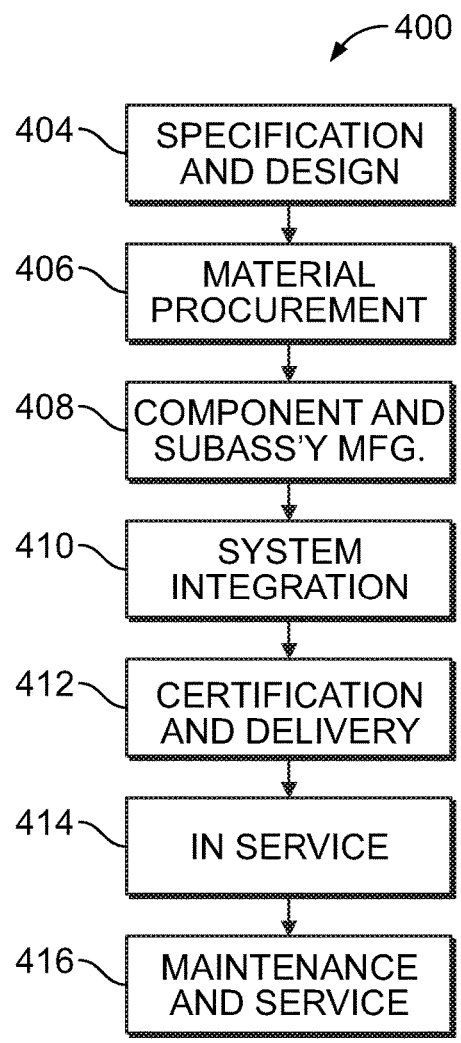
FIG. 22 is a flow diagram of an aircraft manufacturing and service methodology.
Figure 23:
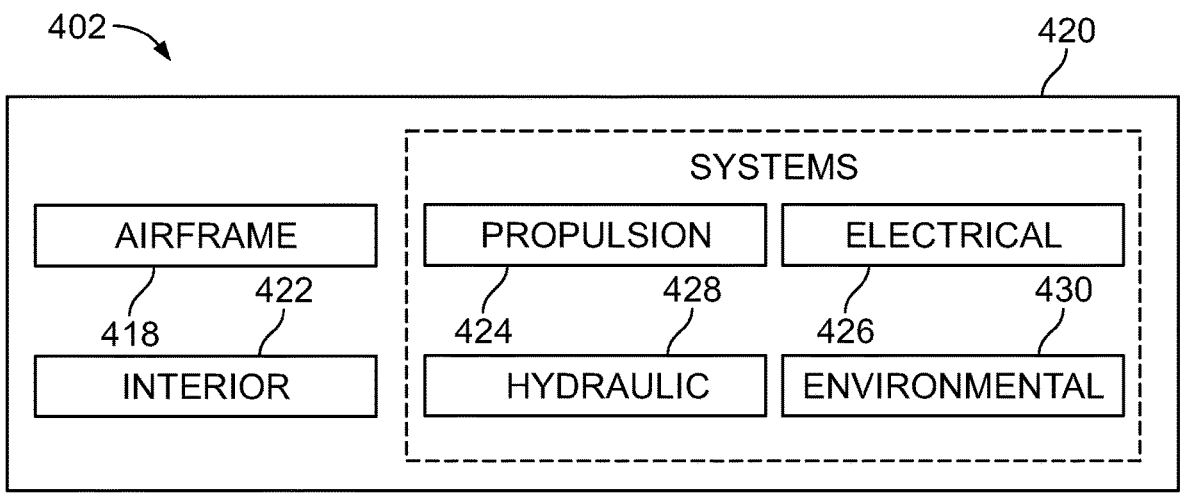
FIG. 23 is a block diagram of an aircraft.

Referring to FIGS. 22 and 23, embodiments of the disclosure may be described in the context of an aircraft manufacturing and service method 400 as shown in FIG. 22 and an aircraft 402 as shown in FIG. 23. During pre-production, exemplary method 400 may include specification and design 404 of the aircraft 402 and material procurement 406. During production, component and subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 23, the aircraft 402 produced by exemplary method 400 may include an airframe 418 with a plurality of systems 420 and an interior 422. Examples of high-level systems 420 include one or more of a propulsion system 424, an electrical system 426, a hydraulic system 428, and an environmental system 430. Any number of other systems may be included. Although an aerospace example is shown, the principles of the invention may be applied to other industries, such as the automotive industry.

Apparatus and methods embodied herein may be employed during any one or more of the stages of the production and service method 400. For example, components or subassemblies corresponding to production process 408 may be fabricated or manufactured in a manner similar to components or subassemblies produced while the aircraft 402 is in service. Also, one or more apparatus embodiments, method embodiments, or a combination thereof may be utilized during the production stages 408 and 410, for example, by substantially expediting assembly of or reducing the cost of an aircraft 402. Similarly, one or more of apparatus embodiments, method embodiments, or a combination thereof may be utilized while the aircraft 402 is in service, for example and without limitation, to maintenance and service 416.

As described above, embodiments of the present disclosure provide systems and methods for forming perforations in an acoustic structure that minimize, eliminate, or otherwise reduce the occurrence of blocked or missing perforations, and which may be performed in a timely and cost-effective manner. Further, embodiments of the present disclosure provide systems and methods for efficiently forming perforations within an acoustic structure. Moreover, embodiments of the present disclosure provide systems and methods of manufacturing complex geometric patterns of perforations on an acoustic inlet barrel of an aircraft engine, or other such structure.

As described above, embodiments of the present disclosure provide systems and methods of forming an acoustic inlet barrel of an engine of an aircraft. Embodiments of the present disclosure may be used with respect to various other components other than acoustic inlet barrels. For example, embodiments of the present disclosure may be used with respect to various other acoustic treatments within propulsion systems, such as translating sleeves, inner walls, and the like. In short, embodiments of the present disclosure are not limited to acoustic inlet barrels.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method of fabricating an engine inlet of an engine, the method comprising:
providing an engine inlet barrel section configured as a composite sandwich structure having an inner face sheet; and
robotically drilling, using a plurality of synchronized robotic drilling units, a plurality of elongated, non-circular perforations in the inner face sheet after final cure of the composite sandwich structure, wherein the robotically drilling comprises indexing a hole pattern of the elongated, non-circular perforations to one or more cell walls of a honeycomb core of the composite sandwich structure, and positioning the hole pattern of the elongated, non-circular perforations such that each of the elongated, non-circular perforations is located at a spaced distance from the one or more cell walls.

2. The method of claim 1, further comprising forming the plurality of perforations in a quantity providing a predetermined percent-open-area of the inner face sheet.

3. The method of claim 1, wherein the robotically drilling operation comprises using the plurality of synchronized robotic drilling units to elongate each of the elongated, non-circular perforations with respect to a longitudinal axis that aligns with a flow contour line of airflow through the engine.

4. The method of claim 1, wherein the robotically drilling operation comprises forming at least one of the elongated, non-circular perforations as an elongated slot.

5. The method of claim 1, wherein the robotically drilling operation comprises forming at least one of the elongated, non-circular perforations as one or more of a teardrop shape, an elliptical shape, or a dogbone shape.

6. The method of claim 1, wherein the providing the engine inlet inner barrel section comprises providing the engine inlet barrel section as a one-piece composite sandwich structure cured in a single stage.

7. The method of claim 1, wherein the robotically drilling comprises drilling the elongated, non-circular perforations to provide a percent-open area in one section of the inner face sheet that is different than the percent-open-area in another section of the inner face sheet.

8. The method of claim 1, wherein the robotically drilling comprises drilling the plurality of elongated, non-circular perforations using the plurality of synchronized robotic drilling units inside the engine inlet barrel section.

9. The method of claim 1, wherein the robotically drilling comprises simultaneously drilling the plurality of elongated, non-circular perforations in the inner face sheet using drill end effectors of the plurality of synchronized robotic drilling units.

10. The method of claim 1, further comprising indexing the engine inlet barrel section and the plurality of synchronized robotic drilling units to at least one fixture supporting the barrel section.

11. The method of claim 1, wherein the robotically drilling operation comprises using the plurality of synchronized robotic drilling units to elongate each of the elongated, non-circular perforations with respect to a longitudinal axis that does not align with a flow contour line of airflow through the engine.

12. A method of fabricating an engine inlet of an engine, the method comprising:
providing an engine inlet barrel section configured as a composite sandwich structure having an inner face sheet, wherein the providing the engine inlet inner barrel section comprises providing the engine inlet barrel section as a one-piece composite sandwich structure cured in a single stage;
robotically drilling, using a plurality of synchronized robotic drilling units, a plurality of elongated, non-circular perforations in the inner face sheet after final cure of the composite sandwich structure, wherein the robotically drilling comprises indexing a hole pattern of the elongated, non-circular perforations to one or more cell walls of a honeycomb core of the composite sandwich structure, and positioning the hole pattern of the elongated, non-circular perforations such that each of the elongated, non-circular perforations is located at a spaced distance from the one or more cell walls; and
forming the plurality of perforations in a quantity providing a predetermined percent-open-area of the inner face sheet.

13. The method of claim 12, wherein the robotically drilling operation comprises using the plurality of synchronized robotic drilling units to elongate each of the elongated, non-circular perforations with respect to a longitudinal axis that aligns with a flow contour line of airflow through the engine.

14. The method of claim 12, wherein the robotically drilling operation comprises forming at least one of the elongated, non-circular perforations as an elongated slot.

15. The method of claim 12, wherein the robotically drilling operation comprises forming at least one of the elongated, non-circular perforations as one or more of a teardrop shape, an elliptical shape, or a dogbone shape.

16. The method of claim 12, wherein the robotically drilling comprises drilling the elongated, non-circular perforations to provide a percent-open area in one section of the inner face sheet that is different than the percent-open-area in another section of the inner face sheet.

17. The method of claim 12, wherein the robotically drilling comprises drilling the plurality of elongated, non-circular perforations using the plurality of synchronized robotic drilling units inside the engine inlet barrel section.

18. The method of claim 12, wherein the robotically drilling comprises simultaneously drilling the plurality of elongated, non-circular perforations in the inner face sheet using drill end effectors of the plurality of synchronized robotic drilling units.

19. The method of claim 12, further comprising indexing the engine inlet barrel section and the plurality of synchronized robotic drilling units to at least one fixture supporting the barrel section.

20. The method of claim 12, wherein the robotically drilling operation comprises using the plurality of synchronized robotic drilling units to elongate each of the elongated, non-circular perforations with respect to a longitudinal axis that does not align with a flow contour line of airflow through the engine.

21. A method of fabricating an engine inlet of an engine, the method comprising:
providing an engine inlet barrel section configured as a composite sandwich structure having an inner face sheet, wherein the providing the engine inlet inner barrel section comprises providing the engine inlet barrel section as a one-piece composite sandwich structure cured in a single stage;
robotically drilling, using a plurality of synchronized robotic drilling units inside the engine inlet barrel section, a plurality of elongated, non-circular perforations in the inner face sheet after final cure of the composite sandwich structure to provide a percent-open area in one section of the inner face sheet that is different than the percent-open-area in another section of the inner face sheet, wherein the robotically drilling comprises:
indexing a hole pattern of the elongated, non-circular perforations to one or more cell walls of a honeycomb core of the composite sandwich structure;
positioning the hole pattern of the elongated, non-circular perforations such that each of the elongated, non-circular perforations is located at a spaced distance from the one or more cell walls; and
using the plurality of synchronized robotic drilling units to elongate each of the elongated, non-circular perforations with respect to a longitudinal axis that aligns with a flow contour line of airflow through the engine;
forming the plurality of perforations in a quantity providing a predetermined percent-open-area of the inner face sheet; and
indexing the engine inlet barrel section and the plurality of synchronized robotic drilling units to at least one fixture supporting the barrel section.

22. The method of claim 21, wherein the robotically drilling further comprises simultaneously drilling the plurality of elongated, non-circular perforations in the inner face sheet using drill end effectors of the plurality of synchronized robotic drilling units.

* * * * *